United States Patent
Bala et al.

(10) Patent No.: US 12,389,426 B2
(45) Date of Patent: *Aug. 12, 2025

(54) PHYSICAL (PHY) LAYER SOLUTIONS TO SUPPORT USE OF MIXED NUMEROLOGIES IN THE SAME CHANNEL

(71) Applicant: InterDigital Patent Holdings, Inc., Wilmington, DE (US)

(72) Inventors: Erdem Bala, East Meadow, NY (US); Afshin Haghighat, Ile-Bizard (CA); Mihaela C. Beluri, Jericho, NY (US); Rui Yang, Greenlawn, NY (US); Ananth Kini, Conshohocken, PA (US); Janet A. Stern-Berkowitz, Little Neck, NY (US); Alphan Sahin, Westbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,632

(22) Filed: May 23, 2024

(65) Prior Publication Data

US 2024/0314794 A1    Sep. 19, 2024

Related U.S. Application Data

(63) Continuation of application No. 18/299,396, filed on Apr. 12, 2023, now Pat. No. 12,058,698, which is a (Continued)

(51) Int. Cl.
*H04W 72/23* (2023.01)
*H04L 1/1867* (2023.01)
(Continued)

(52) U.S. Cl.
CPC ........... *H04W 72/23* (2023.01); *H04L 1/1893* (2013.01); *H04L 27/0008* (2013.01);
(Continued)

(58) Field of Classification Search
CPC ... H04W 72/23; H04W 72/51; H04W 72/541; H04W 52/262; H04L 1/1893;
(Continued)

(56) References Cited

U.S. PATENT DOCUMENTS 8,638,761 B2    1/2014  Taghavi Nasrabadi et al.
8,891,461 B2    11/2014 Xiao et al.
(Continued)

FOREIGN PATENT DOCUMENTS

CN      103580807        2/2014
EP      2556609 B1       9/2013
(Continued)

OTHER PUBLICATIONS

Carlton, "Will 5G say farewell to OFDM," Computerworld (Mar. 14, 2016).
(Continued)

*Primary Examiner* — Candal Elpenord
(74) *Attorney, Agent, or Firm* — VOLPE KOENIG

(57) ABSTRACT

A wireless transmit/receive unit (WTRU) may receive assignment information for receiving a first codeword using a first modulation and coding scheme (MCS) in a first set of resource blocks (RBs), and a second codeword using a second, different MCS in a second set of RBs. The first and second sets of RBs may be in a first time interval in a first bandwidth part using a first subcarrier spacing. The WTRU may receive, in symbols of the first time interval in the first bandwidth part, the first codeword using the first MCS in the first set of RBs and the second codeword using the second, different MCS in the second set of RBs. At least a portion of (Continued)

the first codeword and at least a portion of the second codeword may be received in at least a first symbol in the symbols in the first time interval.

18 Claims, 15 Drawing Sheets

Related U.S. Application Data continuation of application No. 17/581,492, filed on Jan. 21, 2022, now Pat. No. 11,638,247, which is a continuation of application No. 16/859,479, filed on Apr. 27, 2020, now abandoned, which is a continuation of application No. 16/300,336, filed as application No. PCT/US2017/032222 on May 11, 2017, now Pat. No. 10,638,473.

(60) Provisional application No. 62/334,882, filed on May 11, 2016.

(51) Int. Cl.
*H04L 27/00* (2006.01)
*H04W 52/26* (2009.01)
*H04W 72/51* (2023.01)
*H04W 72/541* (2023.01)

(52) U.S. Cl.
CPC ......... *H04W 72/51* (2023.01); *H04W 72/541* (2023.01); *H04W 52/262* (2013.01)

(58) Field of Classification Search
CPC . H04L 5/0046; H04L 5/0055; H04L 27/2602; H04L 27/26025
USPC .................................................. 370/329–330
See application file for complete search history.

(56) References Cited

U.S. PATENT DOCUMENTS

| | | |
|---|---|---|
| 8,913,479 B2 | 12/2014 | Bhushan et al. |
| 8,958,494 B2 | 2/2015 | Beluri et al. |
| 9,143,304 B2 | 9/2015 | Lee et al. |
| 9,634,802 B2 | 4/2017 | Yerramalli et al. |
| 9,801,232 B2 | 10/2017 | Deenoo et al. |
| 9,906,325 B2 | 2/2018 | Ohana et al. |
| 9,980,239 B2 | 5/2018 | Xing et al. |
| 10,285,146 B2 | 5/2019 | Urabayashi et al. |
| 10,715,373 B2 | 7/2020 | Kim et al. |
| 10,728,852 B2 | 7/2020 | Zhang et al. |
| 10,868,643 B2 | 12/2020 | Boudreau et al. |
| 11,140,640 B2 | 10/2021 | Tooher et al. |
| 2004/0246998 A1 | 12/2004 | Ma et al. |
| 2007/0223618 A1 | 9/2007 | Jeong et al. |
| 2010/0162073 A1 | 6/2010 | Myung et al. |
| 2011/0004799 A1 | 1/2011 | Shimanuki et al. |
| 2011/0022918 A1 | 1/2011 | Kwon et al. |
| 2011/0116448 A1 | 5/2011 | Jongren |
| 2011/0317778 A1 | 12/2011 | Hooli et al. |
| 2012/0051245 A1 | 3/2012 | Nam et al. |
| 2012/0320858 A1 | 12/2012 | Maru |
| 2013/0064212 A1 | 3/2013 | Ogawa et al. |
| 2013/0083749 A1 | 4/2013 | Xu et al. |
| 2013/0170469 A1 | 7/2013 | Yu et al. |
| 2013/0242906 A1 | 9/2013 | Li et al. |
| 2014/0086173 A1 | 3/2014 | Sadeghi et al. |
| 2014/0105164 A1 | 4/2014 | Moulsley et al. |
| 2014/0112417 A1 | 4/2014 | Miyazaki |
| 2014/0192732 A1 | 7/2014 | Chen et al. |
| 2014/0192740 A1 | 7/2014 | Ekpenyong et al. |
| 2014/0321406 A1 | 10/2014 | Marinier et al. |
| 2015/0016239 A1 | 1/2015 | Yi et al. |
| 2015/0071050 A1 | 3/2015 | Iranzo Molinero |
| 2015/0349987 A1 | 12/2015 | Soriaga et al. |
| 2015/0365926 A1 | 12/2015 | Long |
| 2015/0365977 A1 | 12/2015 | Tabet et al. |
| 2015/0381209 A1 | 12/2015 | Roh et al. |
| 2016/0029331 A1 | 1/2016 | Seo et al. |
| 2016/0073339 A1 | 3/2016 | Tabet et al. |
| 2016/0142241 A1 | 5/2016 | Sahlin et al. |
| 2016/0239040 A1 | 8/2016 | Ripley |
| 2016/0294498 A1 | 10/2016 | Ma et al. |
| 2017/0245165 A1 | 8/2017 | Onggosanusi et al. |
| 2017/0279522 A1 | 9/2017 | Yi |
| 2017/0279579 A1 | 9/2017 | Qian et al. |
| 2017/0311276 A1 | 10/2017 | Tsai et al. |
| 2017/0318598 A1 | 11/2017 | Islam et al. |
| 2017/0359791 A1 | 12/2017 | Onggosanusi et al. |
| 2018/0048511 A1 | 2/2018 | Hakola et al. |
| 2018/0054786 A1* | 2/2018 | Yamada ................. H04W 24/10 |
| 2018/0191473 A1 | 7/2018 | Ashraf et al. |
| 2018/0198649 A1 | 7/2018 | Lindoff et al. |
| 2018/0199341 A1 | 7/2018 | Baldemair et al. |
| 2018/0206271 A1 | 7/2018 | Chatterjee et al. |
| 2018/0235012 A1 | 8/2018 | Chen et al. |
| 2018/0249400 A1 | 8/2018 | Harada et al. |
| 2018/0255586 A1 | 9/2018 | Einhaus et al. |
| 2018/0279388 A1 | 9/2018 | Miao et al. |
| 2018/0376439 A1 | 12/2018 | Urabayashi et al. |
| 2019/0029003 A1 | 1/2019 | Takeda et al. |
| 2019/0037606 A1 | 1/2019 | Takeda et al. |
| 2019/0044782 A1 | 2/2019 | Zeng et al. |
| 2019/0045506 A1 | 2/2019 | Takeda et al. |
| 2019/0052503 A1 | 2/2019 | Takahashi et al. |
| 2019/0059075 A1 | 2/2019 | Hayashi et al. |
| 2019/0149384 A1 | 5/2019 | Kim et al. |
| 2019/0208481 A1 | 7/2019 | Tang |
| 2019/0230696 A1 | 7/2019 | Kim et al. |
| 2020/0099499 A1 | 3/2020 | Yeo et al. |
| 2020/0177356 A1 | 6/2020 | Kim et al. |
| 2020/0214049 A1 | 7/2020 | Deenoo et al. |
| 2021/0368487 A1 | 11/2021 | Nam et al. |

FOREIGN PATENT DOCUMENTS

| | | |
|---|---|---|
| EP | 2830243 A1 | 1/2015 |
| EP | 3442141 | 2/2019 |
| EP | 3490316 | 5/2019 |
| WO | 2009/062115 | 5/2009 |
| WO | 2010/024603 | 3/2010 |
| WO | 2010050731 | 5/2010 |
| WO | 2011/132926 | 10/2011 |
| WO | 2015000917 | 1/2015 |
| WO | 2015/172098 | 11/2015 |
| WO | 2016047513 | 3/2016 |
| WO | 2016130175 | 8/2016 |
| WO | 2017035305 | 3/2017 |
| WO | 2017135020 | 8/2017 |
| WO | 2017135312 | 8/2017 |
| WO | 2017153224 | 9/2017 |
| WO | 2017196042 | 11/2017 |
| WO | 2018018417 | 2/2018 |
| WO | 2018031664 | 2/2018 |
| WO | 2018071566 | 4/2018 |
| WO | 2018084636 | 5/2018 |

OTHER PUBLICATIONS

Convida Wireless, "Discussion on Sync Signals Supporting Different Numerologies," 3GPP TSG RAN WG1 Meeting #86, Gothenburg, Sweden, R1-167847 (Aug. 22-26, 2016).

Ericsson et al., "Activation/deactivation of bandwidth part," 3GPP TSG RAN1 NR Ad-Hoc#2, R1-1711853, Qingdao, P.R. China (Jun. 27-30, 2017).

Ericsson et al., "Way Forward on bandwidth part for efficient wideband operation in NR," 3GPP TSG-RAN WG1 #89, R1-17xxxxx (R1-1709802), Hangzhou, P.R. China (May 15-19, 2017).

Ericsson, "5G—Key Component of the Networked Society," 3GPP RAN Workshop on 5G, RWS-150009, Phoenix, AZ, USA (Sep. 17-18, 2015).

(56) References Cited

OTHER PUBLICATIONS

Ericsson, "Feasibility of Mixing Numerology in an OFDM System," 3GPP TSG RAN WG1 Meeting #84bis, R1-163224, Busan, Korea (Apr. 11-15, 2016).
Huawei et al., "Discussion on frame structure for NR," 3GPP TSG RAN WG1 Meeting #85, R1-164032, Nanjing, China (May 23-27, 2016).
Huawei et al., "Discussion on UE behavior on mixed numerology carrier," 3GPP TSG RAN WG1 Meeting #86bis, R1-1609425, Lisbon, Portugal (Oct. 10-14, 2016).
Huawei et al., "On numerology determination during initial access," 3GPP TSG RAN WG1 Meeting #87, R1-1611651, Reno, USA (Nov. 14-18, 2016).
Huawei et al., "Scenario & design criteria on flexible numerologies," 3GPP TSG RAN WG1 Meeting #84bis, R1-162156, Busan, Korea (Apr. 11-15, 2016).
Huawei et al., "Technical Considerations on Subcarrier Spacing," 3GPP TSG RAN WG1 Meeting #82bis, R1-155964, Malmo, Sweden (Oct. 5-9, 2015).
Huawei et al., "WF on bandwidth part," 3GPP TSG RAN WG1 Meeting #88bis, R1-1706582, Spokane, USA (Apr. 3-7, 2017).
Huawei et al., "WF on resource allocation for data transmission," 3GPP TSG RAN WG1 Meeting #88, R1-1703781, Athens, Greece (Feb. 13-17, 2017).
Intel Corporation, "Design on NR DL Synchronization," 3GPP TSG RAN WG1 Meeting #86, Gothenburg, Sweden, R1-167705 (Aug. 22-26, 2016).
Intel Corporation, "Nb-Iot Uplink Shared Channel Design," 3GPP TSG RAN WG1 Nb-Iot Ad-Hoc Meeting, R1-160131, Budapest, Hungary (Jan. 18-20, 2016).
Intel Corporation, "Overview of new radio access technology requirements and designs," 3GPP TSG RAN WG1 Meeting #84bis, R1-162379, Busan, Korea (Apr. 11-15, 2016).
Intel et al., "Way forward on further details of bandwidth part operation," 3GPP TSG-RAN WG1 Ad-Hoc #2, R1-1711788, Qingdao, P.R. China (Jun. 27-30, 2017).
Intel et al., "Way forward on PRB indexing," 3GPP TSG-RAN WG1 Ad-Hoc #2, R1-1711855, Qingdao, P.R. China (Jun. 27-30, 2017).
Interdigital Communications, "A Framework for Initial Access for NR," 3GPP TSG-RAN WG1 #86bis, R1-1610351, Lisbon, Portugal, (Oct. 10-14, 2016).
Interdigital Communications, "Considerations on SS Burst Design and Indication," 3GPP TSG RAN WG1 Meeting #88, R1-1702315, Athens, Greece (Feb. 13-17, 2017).
Interdigital Communications, "Control Plane Functions and transport mechanism for Interworking between NR and LTE," 3GPP TSG-RAN WG2 #95bis, R2-166856, Kaohsiung, Taiwan (Oct. 10-14, 2016).
Interdigital Communications, "DL control channel framework for NR," 3GPP TSG-RAN WG1 #86bis, R1-1610089, Lisbon, Portugal, (Oct. 10-14, 2016).
Interdigital Communications, "Forward compatible control channel framework for NR," 3GPP TSG-RAN WG1 #86, R1-167327, Göteborg, Sweden (Aug. 22-26, 2016).
Interdigital Communications, "On NR-PBCH Transmission," 3GPP TSG RAN WG1 Meeting #88bis, R1-1705500, Spokane, USA (Apr. 3-7, 2017).
Interdigital Communications, "Random Access and Support for Multiple Numerologies for NR," 3GPP TSG-RAN WG1 #86bis, R1-1610352, Lisbon, Portugal (Oct. 10-14, 2016).
Interdigital Communications, "UE Support for Multiple Numerologies with NR," 3GPP TSG-RAN WG1 #86, R1-165055, Göteborg, Sweden (Aug. 22-26, 2016).
Interdigital Communications, "UE Support for Multiple Numerologies for NR," 3GPP TSG-RAN WG1 #86bis, R1-1610022, Lisbon, Portugal, (Oct. 10-14, 2016).
Interdigital Communications, "UE Support for Multiple Numerologies with NR," 3GPP TSG-RAN WG1 #86, R1-167328, Göteborg, Sweden (Aug. 22-26, 2016).

Interdigital, "DL data scheduling," 3GPP TSG RAN WG1 Meeting #89, R1-1709010, Hangzhou, P.R. China (May 15-19, 2017).
Interdigital, Inc., "On frequency-domain resource allocation for NR," 3GPP TSG RAN WG1 NR Ad-Hoc#2, R1-1710953, Qingdao, P.R. China (Jun. 27-30, 2017).
International Telecommunciation Union, "IMT Vision—Framework and overall objectives of the future development of IMT for 2020 and beyond; M Series Mobile, radiodetermination, amateur and related satellite services," Recommendation ITU-R M.2083-0 (Sep. 2015).
Lenovo, "Random Access Procedure for Nb-Iot," 3GPP TSG-RAN WG1 Meeting #84, R1-161009, St. Julian's, Malta (Feb. 15-19, 2016).
LG Electronics et al., "WF on configuration of a BWP in wider bandwidth operation," 3GPP TSG RAN1 NR Ad-Hoc#2, R1-1711812, Qingdao, P.R. China (Jun. 27-30, 2017).
Mediatek et al., "Way Forward on bandwidth part in NR," 3GPP TSG-RAN WG1 #88bis, R1-1706745, Spokane, USA (Apr. 3-7, 2017).
Mediatek et al., "Way Forward on Bandwidth Part Operation," 3GPP TSG-RAN WG1 Meeting #90, R1-1715307, Prague, Czech Republic (Aug. 21-25, 2017).
Mediatek et al., "Way Forward on Further Details for Bandwidth Part," 3GPP TSG-RAN WG1 NR Ad-Hoc Meeting, R1-1711802, Qingdao, P.R. China (Jun. 27-30, 2017).
Mediatek Inc., "Consideration on synchronization channel design for NB IoT," 3GPP TSG RAN WG1 Meeting #82bis, R1-155894, Malmö, Sweden (Oct. 5-9, 2015).
Mitsubishi Electric, "Performance comparison of nonlinear precoding schemes for NR MU-MIMO," 3GPP TSG-RAN WG1 #86bis, R1-1610229, Lisbon, Portugal (Oct. 10-14, 2016).
Nokia et al., "Flexible numerology for 5G New Radio," 3GPP TSG-RAN WG1 Meeting #84bis, R1-162894, Busan, Korea (Apr. 11-15, 2016).
Nokia Networks et al., "Random Access procedure for Nb-Iot," 3GPP TSG-RAN WG1 Meeting #84, R1-160458, St. Julian's, Malta (Feb. 15-19, 2016).
Ntt Docomo et al., "Way forward on RBG size," 3GPP Tsg Ran WG1 Meeting #89, R1-1709740, Hangzhou, P.R. China (May 15-19, 2017).
NTT Docomo, "Random access procedure for NB-PDSCH," 3GPP TSG RAN WG1 Nb-Iot Ad-Hoc Meeting, R1-161022, St Julian's, Malta (Feb. 15-19, 2016).
Oppo et al., "Outputs of offline discussion on RBG size/number determination," 3GPP TSG RAN WG1 NR Ad-Hoc#2, R1-1711843, Qingdao, P.R. China (Jun. 27-30, 2017).
Oppo et al., "WF on bandwidth part configuration," 3GPP TSG RAN WG1 Meeting #89, R1-1709519, Hangzhou, P.R. China (May 15-19, 2017).
Panasonic, "Use of multiple numerologies in NR," 3GPP TSG RAN WG1 Meeting #86, R1-167439, Gothenburg, Sweden (Aug. 22-26, 2016).
Rao et al., "Protocol Signaling Procedures in LTE," Radisys White Paper, 11 pages (Sep. 2011).
Sadek et al., "A Leakage-Based Precoding Scheme for Downlink Multi-User MIMO Channels," IEEE Transactions on Wireless Communications, vol. 6, No. 5, pp. 1711-1721 (May 2007).
Samsung, "Overview on issues for NR initial access," 3GPP TSG RAN WG1 Meeting #86, R1-166796, Gothenburg, Sweden (Aug. 22-26, 2016).
Sharetechnote, "5G—Frame Structure," pp. 1-6 (Apr. 11, 2016) available at https://web.archive.org/web/20160411134726/http://www.sharetechnote.com/html/5G/5G_FrameStructure_Candidate.html.
Third Generation Partnership Project, "Technical Specification Group Radio Access Network; Study on New Radio Access Technology Physical Layer Aspects (Release 14)," 3GPP TR 38.802 V14.0.0 (Mar. 2017).
Third Generation Partnership Project, "Technical Specification Group Radio Access Network; Study on New Radio Access Technology Physical Layer Aspects (Release 14)," 3GPP TR 38.912 V14.0.0 (Mar. 2017).

(56) References Cited

OTHER PUBLICATIONS

Third Generation Partnership Project, "Technical Specification Group Radio Access Network; Study on Scenarios and Requirements for Next Generation Access Technologies; (Release 14)," 3GPP TR 38.913 V0.3.0 (Mar. 2016).
Third Generation Partnership Project, "Technical Specification Group Radio Access Network; Study on Scenarios and Requirements for Next Generation Access Technologies; (Release 14)," 3GPP TR 38.913 V14.2.0 (Mar. 2017).
Third Generation Partnership Project, "Technical Specification Group Radio Access Network; Study on New Radio Access Technology; Radio Interface Protocol Aspects (Release 14)," 3GPP TR 38.804 V14.0.0 (Mar. 2017).
Third Generation Partnership Project, "Technical Specification Group Services and System Aspects; Vocabulary for 3GPP Specifications (Release 13)," 3GPP TR 21.905 V13.0.0 (Dec. 2015).
Third Generation Partnership Project, "Technical Specification Group Services and System Aspects; Vocabulary for 3GPP Specifications (Release 14)," 3GPP TR 21.905 V14.0.0 (Mar. 2017).
Third Generation Partnership Project, "Technical Specification Group Radio Access Network; Evolved Universal Terrestrial Radio Access (E-UTRA); Physical layer procedures (Release 13)," 3GPP TS 36.213 V13.1.1 (Mar. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.5.0 (Mar. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.2.0 (Mar. 2017).
Third Generation Partnership Project, "Technical Specification Group Radio Access Network; Evolved Universal Terrestrial Radio Access (E-UTRA); Base Station (BS) radio transmission and reception; (Release 8)," 3GPP TR 36.804 V1.2.0 (Apr. 2008).
Third Generation Partnership Project, "Technical Specification Group Radio Access Network; Evolved Universal Terrestrial Radio Access (E-UTRA); NB-IOT; Technical Report for BS and UE radio transmission and reception (Release 13)," 3GPP TR 36.802 V13.0.0 (Jun. 2016).
Third Generation Partnership Project, "Technical Specification Group Radio Access Networks; Narrowband Internet of Things (NB-IoT); Technical Report for BS and UE radio transmission and reception (Release 13)," 3GPP TR 36.802 V0.1.0 (Feb. 2016).
Third Generation Partnership Project, "Technical Specification Group Radio Access Network; Feasibility study for Further Advancements for E-UTRA (LTE-Advanced) (Release 13)," 3GPP TR 36.912 V13.0.0 (Dec. 2015).
Third Generation Partnership Project, "Technical Specification Group Radio Access Network; Feasibility study for Further Advancements for E-UTRA (LTE-Advanced) (Release 14)," 3GPP TR 36.912 V14.0.0 (Mar. 2017).
Third Generation Partnership Project, "Technical Specification Group Radio Access Network; Requirements for further advancements for Evolved Universal Terrestrial Radio Access (E-Utra) (LTE-Advanced) (Release 14)," 3GPP TR 36.913 V14.0.0 (Mar. 2017).
Third Generation Partnership Project, "Technical Specification Group Radio Access Network; Requirements for further advancements for Evolved Universal Terrestrial Radio Access (E-UTRA) (LTE-Advanced) (Release 13)," 3GPP TR 36.913 V13.0.0 (Dec. 2015).
Third Generation Partnership Project, "Technical Specification Group Radio Access Network; NR; Base Station (BS) radio transmission and reception (Release 15)," 3GPP TS 38.104 V0.0.2 (May 2017).
Third Generation Partnership Project, "Technical Specification Group Radio Access Network; Evolved Universal Terrestrial Radio Access (E-UTRA); Base Station (BS) radio transmission and reception (Release 13)," 3GPP TS 36.104 V13.3.0 (Mar. 2016).
Third Generation Partnership Project, "Technical Specification Group Radio Access Network; Evolved Universal Terrestrial Radio Access (E-UTRA); Base Station (BS) radio transmission and reception (Release 13)," 3GPP TS 36.104 V13.7.0 (Mar. 2017).
Third Generation Partnership Project, "Technical Specification Group Radio Access Network; Evolved Universal Terrestrial Radio Access (E-UTRA); Base Station (BS) radio transmission and reception (Release 14)," 3GPP TS 36.104 V14.3.0 (Mar. 2017).
Third Generation Partnership Project, "Technical Specification Group Radio Access Network; Evolved Universal Terrestrial Radio Access (E-UTRA); Physical channels and modulation (Release 13)," 3GPP TS 36.211 V13.1.0 (Mar. 2016).
Third Generation Partnership Project, "Technical Specification Group Radio Access Network; Evolved Universal Terrestrial Radio Access (E-UTRA); Physical channels and modulation (Release 13)," 3GPP TS 36.211 V13.5.0 (Mar. 2017).
Third Generation Partnership Project, "Technical Specification Group Radio Access Network; Evolved Universal Terrestrial Radio Access (E-UTRA); Physical channels and modulation (Release 14)," 3GPP TS 36.211 V14.3.0 (Jun. 2017).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.1.0 (Mar. 2016).
Third Generation Partnership Project, "Technical Specification Group Radio Access Network; Evolved Universal Terrestrial Radio Access (E-UTRA); Multiplexing and channel coding (Release 13)," 3GPP TS 36.212 V13.5.0 (Mar. 2017).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.2.0 (Mar. 2017).
Third Generation Partnership Project, "Technical Specification Group Radio Access Network; Evolved Universal Terrestrial Radio Access (E-UTRA); Physical layer; Measurements (Release 13)," 3GPP TS 36.214 V13.4.0 (Dec. 2016).
Third Generation Partnership Project, "Technical Specification Group Radio Access Network; Evolved Universal Terrestrial Radio Access (E-UTRA); Physical layer; Measurements (Release 14)," 3GPP TS 36.214 V14.2.0 (Mar. 2017).
Third Generation Partnership Project, "Technical Specification Group Radio Access Network; Evolved Universal Terrestrial Radio Access (E-UTRA); Physical layer; Measurements (Release 13)," 3GPP TS 36.214 V13.1.0 (Mar. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.3.0 (Mar. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.7.0 (Mar. 2017).
Third Generation Partnership Project, "Technical Specification Group Radio Access Network Evolved Universal Terrestrial Radio Access (E-UTRA) and Evolved Universal Terrestrial Radio Access Network (E-UTRAN); Overall description; Stage 2 (Release 14)," 3GPP TS 36.300 V14.2.0 (Mar. 2017).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.1.0 (Mar. 2016).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.5.0 (Mar. 2017).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.2.1 (Mar. 2017).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.1.0 (Mar. 2016).

(56) References Cited

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.5.0 (Mar. 2017).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.2.2 (Apr. 2017).
Third Generation Partnership Project, "Technical Specification Group Radio Access Network; NR; Physical channels and modulation (Release 15)," 3GPP TS 38.211 V0.0.0 (May 2017).
Third Generation Partnership Project, "Technical Specification Group Radio Access Network; NR; Medium Access Control (MAC) protocol specification (Release 15)," 3GPP TS 38.321 V0.0.3 (May 2017).
Third Generation Partnership Project, "Technical Specification Group Radio Access Network; NR; Radio Resource Control (RRC); Protocol specification (Release 15)," 3GPP TS 38.331 V0.0.3 (May 2017).
Third Generation Partnership Project, "Technical Specification Group Radio Access Network; NR; NR and NG-RAN Overall Description; Stage 2 (Release 15)," 3GPP TS 38.300 V0.2.1 (May 2017).
Third Generation Partnership Project, "Technical Specification Group Radio Access Network; Evolved Universal Terrestrial Radio Access (E-UTRA); User Equipment (UE) radio transmission and reception (Release 13)," 3GPP TS 36.101 V13.3.0 (Mar. 2016).
Third Generation Partnership Project, "Technical Specification Group Radio Access Network; Evolved Universal Terrestrial Radio Access (E-UTRA); User Equipment (UE) radio transmission and reception (Release 13)," 3GPP TS 36.101 V13.7.0 (Mar. 2017).
Third Generation Partnership Project, "Technical Specification Group Radio Access Network; Evolved Universal Terrestrial Radio Access (E-UTRA); User Equipment (UE) radio transmission and reception (Release 14)," 3GPP TS 36.101 V14.3.0 (Mar. 2017).
Third Generation Partnership Project, "Technical Specification Group Radio Access Network; Evolved Universal Terrestrial Radio Access (E-UTRA); Services provided by the physical layer (Release 14)," 3GPP TS 36.302 V14.2.0 (Mar. 2017).
Third Generation Partnership Project, "Technical Specification Group Radio Access Network; Evolved Universal Terrestrial Radio Access (E-UTRA); Services provided by the physical layer (Release 13)," 3GPP TS 36.302 V13.1.0 (Mar. 2016).
Third Generation Partnership Project, "Technical Specification Group Radio Access Network; Evolved Universal Terrestrial Radio Access (E-UTRA); Services provided by the physical layer (Release 13)," 3GPP TS 36.302 V13.5.0 (Mar. 2017).
Tripathi et al., "LTE E-UTRAN and its Access Side Protocols," Radisys White Paper, 17 pages (Sep. 2011).
U.S. Appl. No. 62/373,089, "Methods for Flexible Resource Usage," filed Aug. 10, 2016.
U.S. Appl. No. 62/400,950, "Methods for Flexible Resource Usage," filed Sep. 28, 2016.
Xinwei et al., "WF on DL PRB Bundling Size Value Set," 3GPP TSG RAN WG1 RAN1 #89, R1-1709791, Hangzhou, P.R. China (May 15-19, 2017).
Xinwei, "Considerations on Initial Access Design," 3GPP TSG RAN WG1 Meeting #86, R1-166586, Gothenburg, Sweden (Aug. 22-26, 2016).
Zaidi et al., "Waveform and Numerology to Support 5G Services and Requirements," IEEE Communications Magazine, vol. 54, No. 11, pp. 90-98 (Nov. 2016).
ZTE et al., "Forward compatibility for numerology and frame structure design," 3GPP TSG-RAN WG1 Meeting #85, R1-164261, Nanjing, China (May 23-27, 2016).

* cited by examiner

600

620 — MAP A FIRST SET OF BITS IN A FIRST CODEWORD TO A HIGHER ORDER MODULATION SCHEME AND A SECOND SET OF BITS IN THE FIRST CODEWORD TO A LOWER ORDER MODULATION SCHEME.

630 — TRANSMIT THE FIRST CODEWORD.

640 — DETERMINE THAT DATA OF THE FIRST CODEWORD IS TO BE RE-TRANSMITTED ON A SECOND CODEWORD.

650 — MAP A FIRST SET OF BITS IN THE SECOND CODEWORD TO THE LOWER ORDER MODULATION SCHEME AND A SECOND SET OF BITS IN THE SECOND CODEWORD TO THE HIGHER ORDER MODULATION SCHEME.

660 — TRANSMIT THE SECOND CODEWORD

*FIG. 6*

PHYSICAL (PHY) LAYER SOLUTIONS TO SUPPORT USE OF MIXED NUMEROLOGIES IN THE SAME CHANNEL

CROSS-REFERENCE TO RELATED APPLICATIONS

This application is a continuation of U.S. patent application Ser. No. 18/299,396 filed on Apr. 12, 2023, which issued as U.S. Pat. No. 12,058,698 on Aug. 6, 2024, which is a continuation of U.S. patent application Ser. No. 17/581,492, filed Jan. 21, 2022, which issued as U.S. Pat. No. 11,638,247 on Apr. 25, 2023, which is a continuation of U.S. patent application Ser. No. 16/859,479, filed Apr. 27, 2020, which is abandoned, which is a continuation of U.S. patent application Ser. No. 16/300,336 filed Nov. 9, 2018, which issued as U.S. Pat. No. 10,638,473 on Apr. 28, 2020, which is the U.S. National Stage, under 35 U.S.C. § 371, of International Application No. PCT/US2017/032222 filed May 11, 2017, which claims the benefit of U.S. Provisional Application No. 62/334,882, filed May 11, 2016, the contents of which are hereby incorporated by reference herein.

BACKGROUND

New applications continue to emerge for wireless cellular technology. With these new applications, the importance of supporting higher data rates, lower latency, and massive connectivity continues to increase. For example, support for enhanced Mobile BroadBand (eMBB) communications, Ultra-Reliable and Low-Latency Communications (URLLC) and massive Machine Type Communications (mMTC) have been recommended by the International Telecommunication Union (ITU), along with example usage scenarios and desirable radio access capabilities. With a broad range of applications and usage scenarios, radio access capabilities may differ in importance across the range.

For example, for eMBB, spectral efficiency, capacity, user data rates (for example, peak data rates, average data rates or both), and mobility may be of high importance. For the eMBB use case, the choice of the waveform, as well as the numerology, has the potential to improve spectral efficiency. For URLLC, user plane latency may be of high importance. The choice of numerology may help address this aspect. For example, for Orthogonal Frequency-Division Multiplexing (OFDM)/Discrete Fourier Transform-Spread-Orthogonal Frequency-Division Multiplexing (DFT-s-OFDM) based waveforms, if wide sub-carrier spacing is configured, the OFDM symbol length is shorter, which may help reduce the physical (PHY) layer latency.

For mMTC, the connection density, low device complexity, low power consumption, and extended coverage may be of high importance. The choice of the waveform type and the numerology may address some of these requirements. For example, for systems based on the OFDM waveform, a longer cyclic prefix (CP) may be configured for longer OFDM symbols. This may relax the timing requirements and may allow the use of lower cost local oscillators. For example, longer OFDM symbols may be configured with narrower sub-carrier spacing.

SUMMARY OF THE INVENTION

Discussed herein are methods, apparatuses, and systems for improving system performance and spectral efficiency when using mixed Orthogonal Frequency-Division Multiplexing (OFDM) waveform numerologies in adjacent partitions in a single channel. Example methods, apparatuses, and systems include mapping a lower order modulation for first resources that are close to a partition edge, and mapping a higher order modulation for second resources closer to the center of the partition and away from the partition edge.

Specifically, in an example, a wireless transmit/receive unit (WTRU) may map a first set of bits in a first codeword to a higher order modulation scheme and a second set of bits in the first codeword to a lower order modulation scheme. The WTRU may then transmit the first codeword. An eNode-B may then receive the first codeword. Further, the WTRU may determine that data of the first codeword is to be re-transmitted on a second codeword, which may contain the same number of bits as the first codeword. Then, the WTRU may map a first set of bits in the second codeword to the lower order modulation scheme and a second set of bits in the second codeword to the higher order modulation scheme. The first set of bits of the second codeword may contain the same number of bits as the second set of bits of the first codeword and may contain at least a subset of data in the first set of bits of the first codeword. The WTRU may then transmit the second codeword. The eNode-B may then receive the second codeword.

In a further example, the WTRU may receive an assignment message from an eNode-B including instructions regarding partition determination and resource assignment. As a result, the WTRU may determine at least two partitions of bandwidth for wireless communication based on the assignment message, wherein each of the at least two partitions have differing symbol periods, differing subcarrier spacing or both. Further, the WTRU may assign resource blocks (RBs) of the at least two partitions based on the assignment message, wherein RBs of a partition close in at least one of time resources and frequency resources to an adjacent partition are assigned the lower modulation scheme, and wherein the first codeword is transmitted using assigned RBs. In an example, a first partition may have a first numerology and a second partition may have a second numerology.

Further, a base station, such as an eNode-B, may determine that data of the first codeword is to be re-transmitted based on a low signal-to-interference-plus-noise ratio (SINR) of the transmitted first codeword. The eNode-B may transmit a message to the WTRU including instructions to re-transmit data of the first codeword. The WTRU may then determine that data of the first codeword is to be re-transmitted is based on receiving the message. In addition, the mapping the bits of the codewords may be based on at least one of pre-defined processing, dynamically signaled processing and processing signaled in downlink control information (DCI).

In another example, an eNode-B may map a first set of bits in a first codeword to a higher order modulation scheme and a second set of bits in the first codeword to a lower order modulation scheme. The eNode-B may then transmit the first codeword. A WTRU may then receive the first codeword. Further, the eNode-B may determine that data of the first codeword is to be re-transmitted on a second codeword, which may contain the same number of bits as the first codeword. Then, the eNode-B may map a first set of bits in the second codeword to the lower order modulation scheme and a second set of bits in the second codeword to the higher order modulation scheme. The first set of bits of the second codeword may contain the same number of bits as the second set of bits of the first codeword and may contain at least a subset of data in the first set of bits of the first codeword. The eNode-B may then transmit the second codeword and the WTRU may then receive the second codeword.

In an additional example, the eNode-B may determine at least two partitions of bandwidth for wireless communication, wherein each of the at least two partitions have differing symbol periods, differing subcarrier spacing or both. Further, the eNode-B may assign RBs of the at least two partitions, wherein RBs of a partition close in at least one of time resources and frequency resources to an adjacent partition are assigned the lower modulation scheme, and wherein the first codeword is transmitted using assigned RBs. In an example, a first partition may have a first numerology and a second partition may have a second numerology. In an example, the eNode-B may generate and transmit, to the WTRU, an assignment message including the partition determination and the resource assignment.

In a further example, an eNode-B may determine that data of the first codeword is to be re-transmitted based on a low SINR ratio of the transmitted first codeword. For example, the eNode-B may make the determination based on other considerations in addition to or instead of the SINR ratio. The eNode-B may then re-transmit the data on the second codeword. In addition, the mapping the bits of the codewords may be based on at least one of pre-defined processing, dynamically signaled processing and processing signaled in DCI.

In a further example, a WTRU may, in a first codeword, map a first set of bits to a higher order modulation scheme and a second set of bits to a lower order scheme. The WTRU may then transmit the first set of bits in the first codeword at a first allocated power and transmit the second set of bits in the first codeword at a second allocated power.

In an example, the second allocated power may be great than the first allocated power. Further, the WTRU may determine the second allocated power based on power boosting the first allocated power. In another example, the WTRU may receive an assignment message from a base station including instructions regarding partition determination and resource assignment. The WTRU may then determine at least two partitions of bandwidth for wireless communication based on the assignment message, wherein each of the at least two partitions has differing symbol periods, differing subcarrier spacing or both.

In yet another example, a WTRU may receive a first signal including a primary synchronization signal (PSS) and a secondary synchronization signal (SSS). The PSS and SSS may be received in a resource block of a cell and the resource block may have a first numerology. Further, the first numerology may have a first subcarrier spacing, while other resources of the cell at a same time as the resource block may have a second numerology with a different subcarrier spacing than the first numerology. In addition, the WTRU may determine synchronization based on the PSS and SSS. Also, the WTRU may receive a second signal in the cell, and the second signal may have the second numerology. Moreover, the WTRU may transmit user data.

In a further example, the WTRU may search a frequency raster for the PSS and the SSS. Also, the frequency raster may vary based on a frequency band being searched. Additionally, the first numerology may be based on the frequency band being searched.

Further, the first signal may include a broadcast signal for a plurality of WTRUs and a reference signal. Also, the second signal may be received in a part of a cell bandwidth having the second numerology. In addition, the second signal may be a control channel signal. Moreover, the WTRU may transmit a third signal based on the first signal, the second signal or both.

In yet a further example, a WTRU may receive a first signal including a PSS and an SSS in a cell. The PSS and SSS may use a first numerology. Further, the first numerology may have a first subcarrier spacing, while other resources of the cell at a same time as the PSS or the SSS may use a second numerology with a different subcarrier spacing than the first numerology. In addition, the WTRU may synchronize to a timing of the cell based on the PSS and SSS. Also, the WTRU may receive a second signal in the cell, and the second signal may use the second numerology.

Also, the first signal may include a broadcast signal for a plurality of WTRUs and a reference signal. Additionally, the second signal may be received using one or more resources of the other resources, and may be received in a part of a cell bandwidth having the second numerology. Further, the second signal may be a control channel signal.

Further, the PSS and the SSS may be received in a set of resource elements (REs). The PSS may be received in a first symbol in the set of REs. Also, the SSS may be received in a second symbol in the set of REs. Moreover, the first symbol may be a first OFDM symbol. Additionally, the second symbol may be a second OFDM symbol.

In still another example, a WTRU may receive assignment information for receiving a first codeword using a first modulation and coding scheme (MCS) in a first set of RBs, and for receiving a second codeword using a second, different MCS in a second set of RBs. Also, the first and second sets of RBs may be in a first time interval in a first bandwidth part using a first subcarrier spacing. Further, the WTRU may receive, in one or more symbols of the first time interval in the first bandwidth part using the first subcarrier spacing, the first codeword using the first MCS in the first set of RBs and the second codeword using the second, different MCS in the second set of RBs. Moreover, at least a portion of the first codeword and at least a portion of the second codeword may be received in at least a first symbol in the one or more symbols in the first time interval.

In an example, the first MCS may have lower order modulation than the second MCS. Additionally or alternatively, the WTRU may receive a third codeword in a third set of RBs in a second time interval in a second bandwidth part using a second subcarrier spacing. Additionally or alternatively, the WTRU may receive a fourth codeword in a fourth set of RBs in a second time interval in a second bandwidth part using a second subcarrier spacing.

Additionally or alternatively, the assignment information may be received in DCI. Additionally or alternatively, the assignment information may include an overlap in the time domain of the first set of RBs and the second set of RBs. Additionally or alternatively, the first MCS may have a modulation of Quadrature Phase Shift Keying (QPSK), 16-Quadrature Amplitude Modulation (QAM) or 64-QAM. Additionally or alternatively, the second MCS may have a modulation of QPSK, 16-QAM or 64-QAM. Additionally or alternatively, at least a portion of the first codeword and at least a portion of the second codeword may be received in a second symbol in the one or more symbols in the first time interval.

BRIEF DESCRIPTION OF THE DRAWINGS

A more detailed understanding may be had from the following description, given by way of example in conjunction with the accompanying drawings wherein:

FIG. 6 is a flowchart diagram of an example of changing the modulation mapping for re-transmission;

DETAILED DESCRIPTION

Figure 1A:
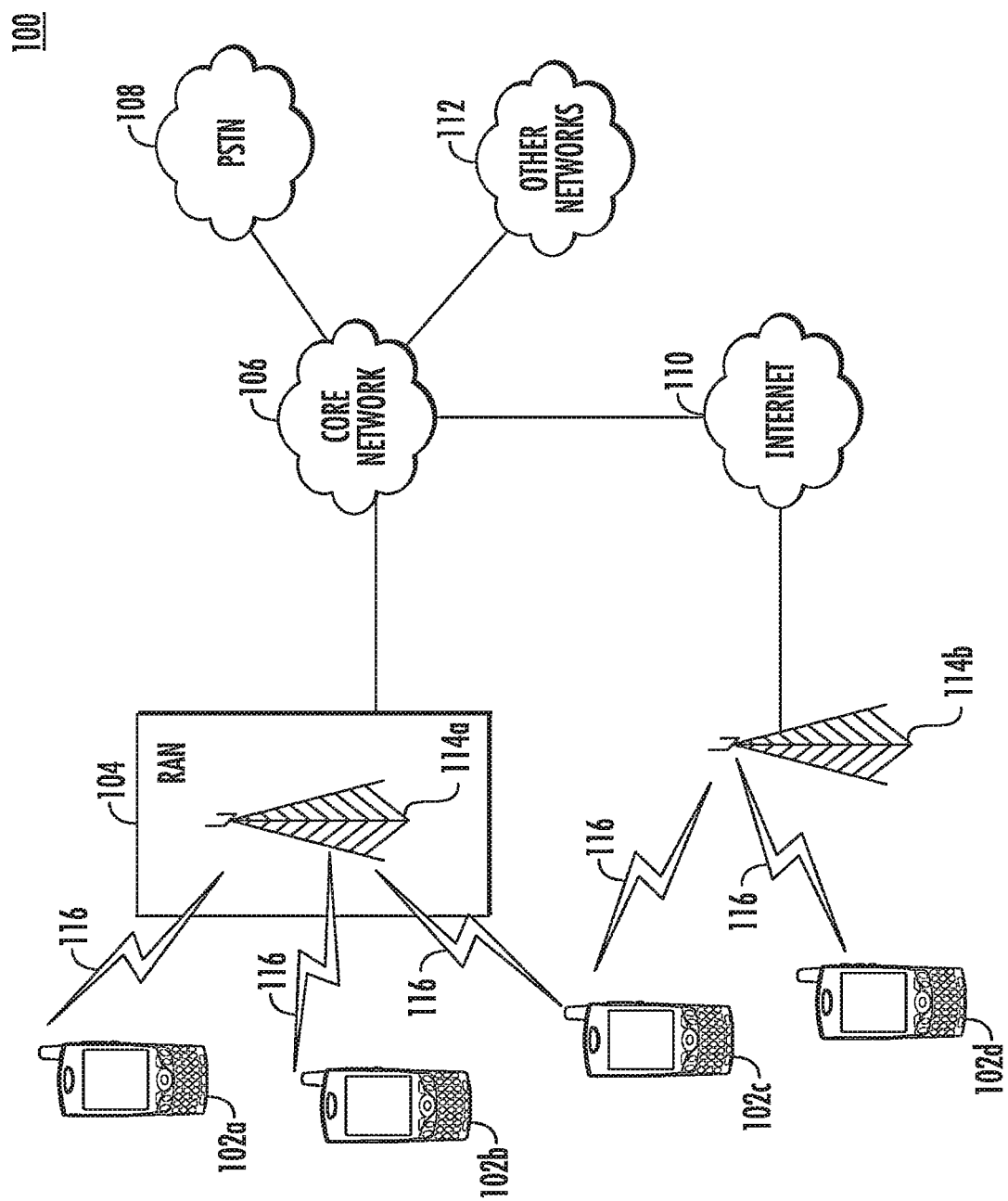
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (for example, radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (for example, WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
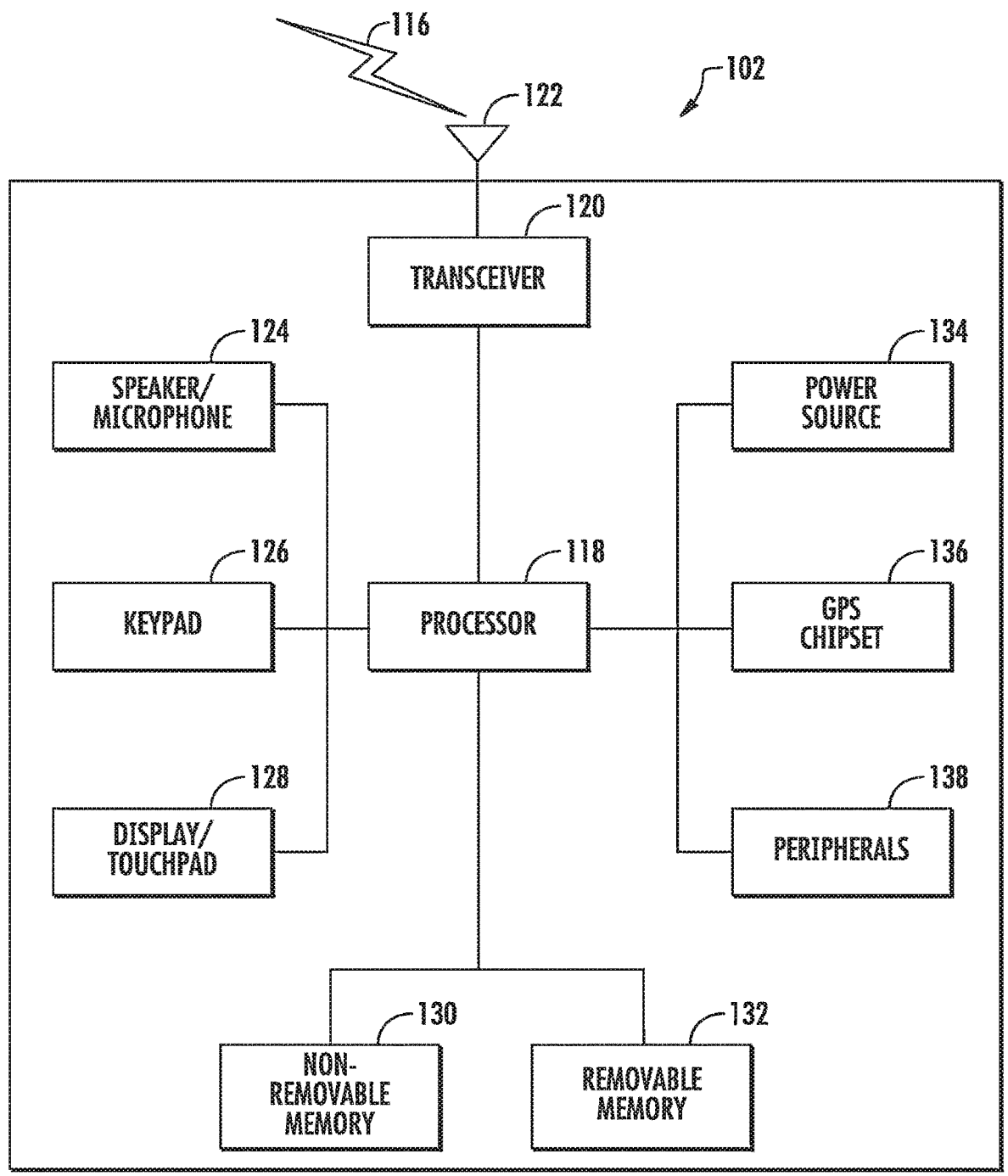
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (for example, the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (for example, multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (for example, a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (for example, nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (for example, longitude and latitude) regarding the current location of the WTRU 102. In addition to, or in lieu of, the information from the GPS chipset 136, the WTRU 102 may receive location information over the air interface 116 from a base station (for example, base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
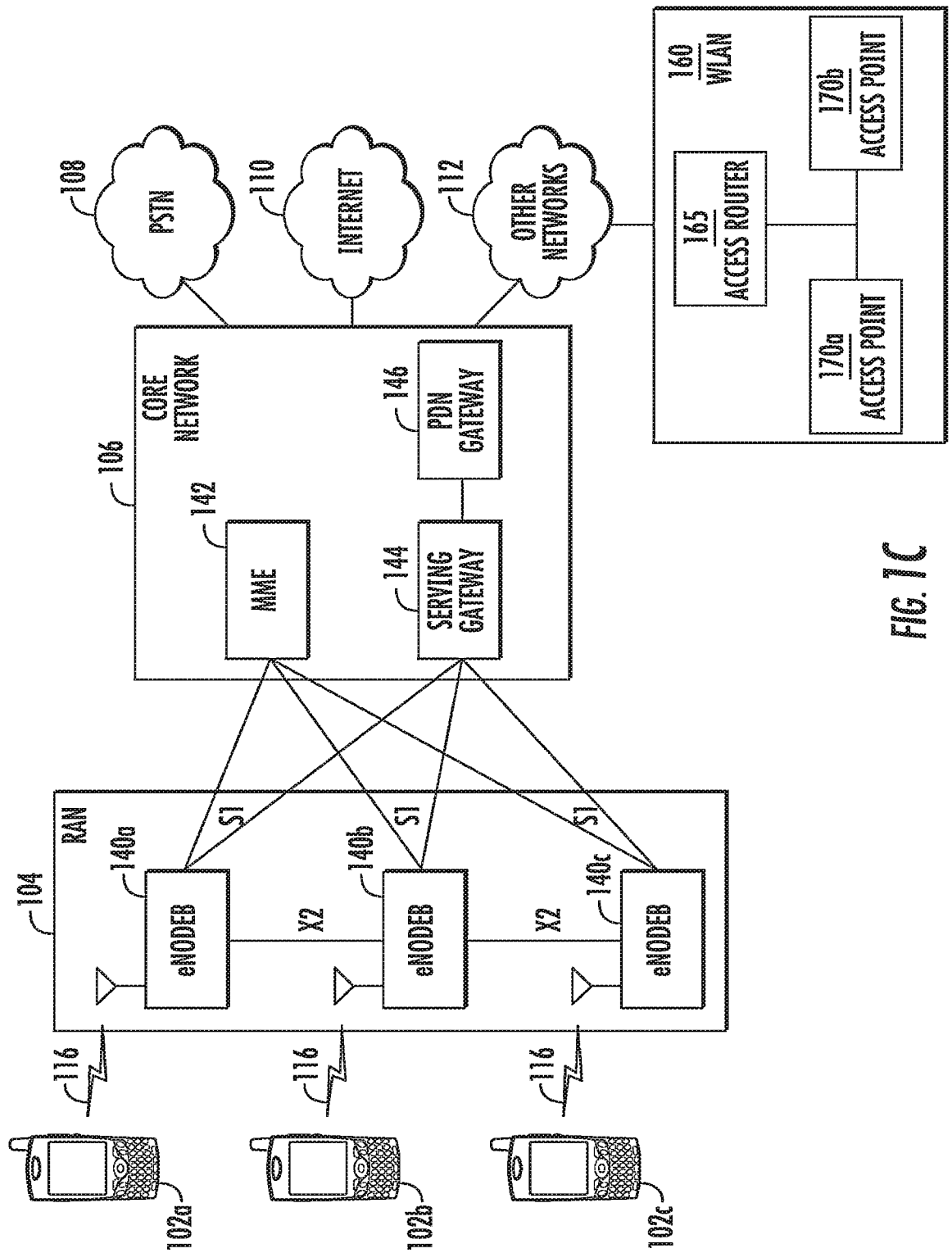
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (for example, an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

With new applications emerging for cellular technology, the importance of supporting higher data rates, lower latency, and massive connectivity continues to increase. For example, the importance of supporting enhanced Mobile BroadBand (eMBB) communications, Ultra-Reliable and Low-Latency Communications (URLLC) and massive Machine Type Communications (mMTC) continues to increase. When multiple applications with differing goals may be supported, developing effective means for multiplexing different services in a radio access network becomes increasingly important.

Wireless communication systems using the Orthogonal Frequency-Division Multiplexing (OFDM) waveform, such as 3GPP LTE and IEEE 802.11, may use a fixed numerology of the OFDM waveform across the allocated system bandwidth. However, with new applications and usage scenarios emerging for cellular technology, the use of mixed numerology may be an attractive way to support different services in the same channel. As used herein, numerology may refer to one or more of the following: sub-carrier spacing, OFDM symbol length, or cyclic prefix (CP) overhead. A resource element may refer to a resource defined by one subcarrier and one symbol.

Figure 2:
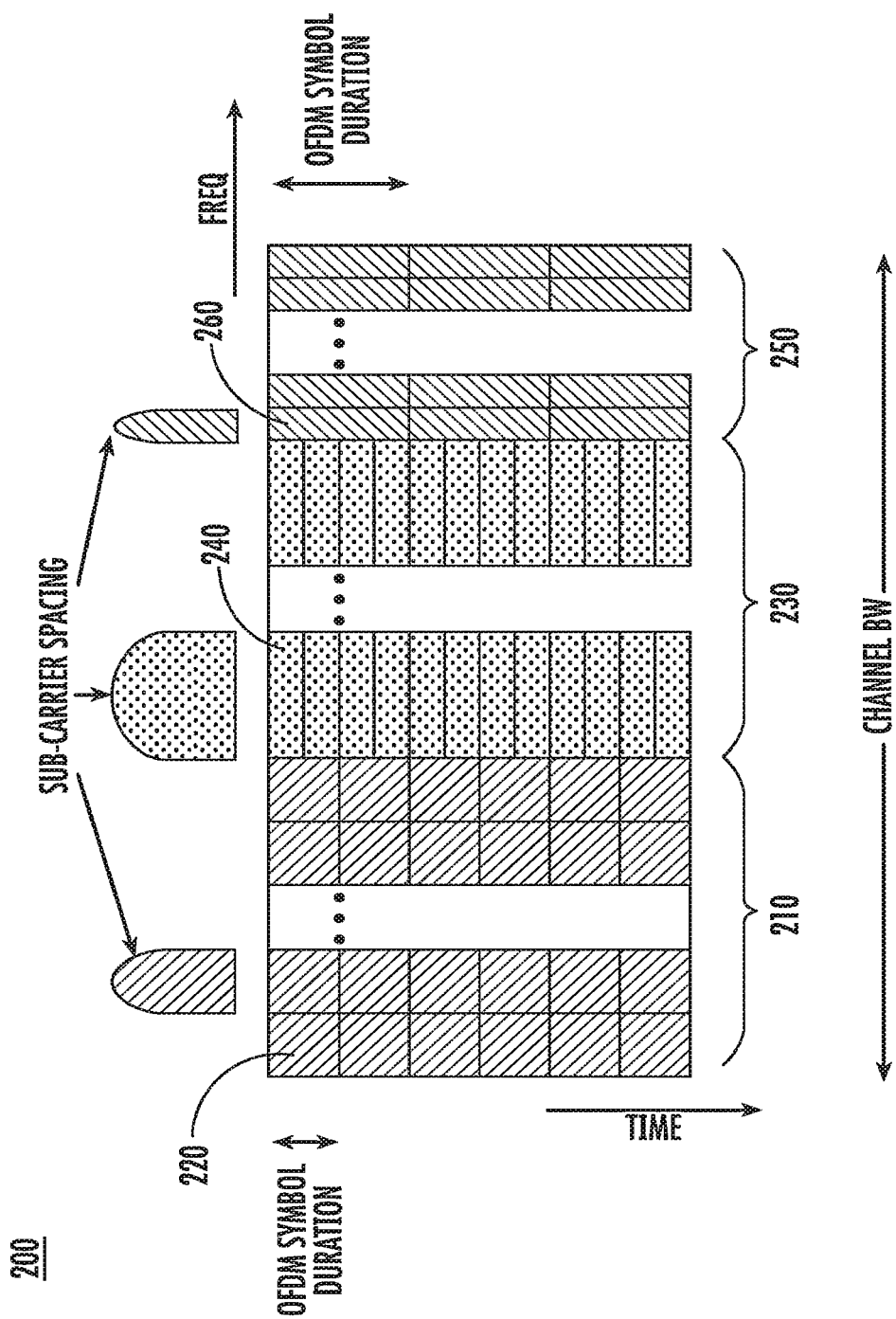
FIG. 2 is a diagram illustrating an example of in-band use of mixed numerology in a waveform operating in adjacent partitions in a channel bandwidth.

FIG. 2 is a diagram illustrating an example of in-band use of mixed numerology in a waveform operating in adjacent partitions in a channel bandwidth. As shown in an example in diagram 200, three numerologies may be used by three different types of communications. For example, a first numerology 210 may be used for eMBB and include resource elements, such as resource element 220, which have a first sub-carrier spacing and a first OFDM symbol duration. Further, a second numerology 230 may be used for URLLC and include resource elements, such as resource element 240, which have a second sub-carrier spacing and a second OFDM symbol duration. In addition, a third numerology 250 may be used for mMTC and include resource elements, such as resource element 260, which have a third sub-carrier spacing and a third OFDM symbol duration.

The OFDM waveform may have high side-lobes in the frequency domain, and high out-of-band (OOB) emissions. If OFDM signals with mixed waveform numerology are transmitted adjacent to each other in the same frequency channel, inter-numerology interference may occur. In the spectral domain, the side-lobes of one numerology may decay slowly with frequency (as a function of 1/f), and may create interference to the sub-carriers of the other numerology in the adjacent partition. This interference may severely degrade the signal-to-noise ratio (SNR) in the adjacent partition, thus limiting the system performance. For example, the interference may limit the data rates that can be attained.

In other scenarios, the system may operate in frequency selective channels, whereby there may be a significant SNR variability within the system bandwidth. Additionally, parts of the channel may suffer from more interference than others. Relying on traditional scheduling to mitigate this SNR variability may not be sufficient for the usage scenarios considered for fifth generation (5G) applications.

In other scenarios, the system may operate in frequency selective channels with non-negligible delay spread. In these scenarios, when there may be transitions or discontinuities at the beginning of a sub-frame or transmission time interval (TTI), the first symbol of the transmission may be impacted by interference, and the received signal-to-interference-plus-noise ratio (SINR) for that symbol may be degraded. In examples, the first symbol may be the first OFDM symbol or the first Discrete Fourier Transform-Spread-Orthogonal Frequency-Division Multiplexing (DFT-s-OFDM) symbol.

Solutions are therefore needed to improve the system performance and spectral efficiency when mixed OFDM waveform numerologies are used in adjacent partitions in the same channel, or when significant SNR variability is encountered within the system bandwidth. Embodiments, examples and solutions described herein may be applied to scenarios with an uneven distribution of SNR within the channel bandwidth, including, but not limited to, mixed numerologies. Examples and embodiments are included herein for downlink (DL) transmissions; however, one of ordinary skill in the art will appreciate that DL transmissions may be used in non-limiting examples of applications. Accordingly, the examples and embodiments may apply to uplink (UL), sidelink (SL) and the like, and still be consistent with the solutions described herein. The terms UL and/or SL may be substituted for DL in the examples and embodiments described herein, and still be consistent with the solutions described herein. In some embodiments and examples, the terms downlink control information (DCI), control information, control channel, control message, may be used interchangeably and still be consistent with the solutions described herein.

Discussed herein are methods, apparatuses, and systems for improving system performance and spectral efficiency when using mixed OFDM waveform numerologies in adjacent partitions in a single channel. Example methods, apparatuses, and systems include mapping a lower order modulation for first resources that are close to a partition edge, and mapping a higher order modulation for second resources closer to the center of the partition and away from the partition edge.

In a specific example, a WTRU may map a first set of bits in a first codeword to a higher order modulation scheme and a second set of bits in the first codeword to a lower order modulation scheme. The WTRU may then transmit the first codeword. An eNode-B may then receive the first codeword. Further, the WTRU may determine that data of the first codeword is to be re-transmitted on a second codeword, which may contain the same number of bits as the first codeword. Then, the WTRU may map a first set of bits in the second codeword to the lower order modulation scheme and a second set of bits in the second codeword to the higher order modulation scheme. The first set of bits of the second codeword may contain the same number of bits as the second set of bits of the first codeword and may contain at least a subset of data in the first set of bits of the first codeword. The WTRU may then transmit the second codeword. The eNode-B may then receive the second codeword.

Additional further examples include assigning a first codeword to a spatial layer, wherein the first codeword is mapped in the frequency domain to first resource blocks (RBs) at a partition edge, and wherein the first codeword is be configured to use a robust modulation and coding scheme (MCS). Additional examples include assigning a second codeword to the spatial layer, wherein the second codeword is mapped in the frequency domain to second RBs located toward the center of the partition, and wherein the second codeword is configured to use a more aggressive MCS; and multiplexing the first codeword and the second codeword in a Frequency-Division Multiplexing (FDM) fashion.

Further, discussed herein are example methods, apparatuses, and systems for improving system performance and spectral efficiency when using mixed OFDM waveform numerologies in adjacent partitions in a single channel. Examples may include performing demodulation reference signal (DMRS) based beamforming on a band edge to minimize interference on the direction of a WTRU of an adjacent service and maximize a transmission efficiency for the service's own WTRU.

Also, herein are example methods, apparatuses, and systems for reducing the impact of interference on the accuracy of the channel estimation in a system with mixed numerology. Examples may include introducing an additional power offset setting for band-edge transmissions; using a different set of power settings for demodulation of reference signals required for channel estimation; and applying the power boosting for the reference signals on reference resource elements (REs) located on the band-edge.

In addition, discussed herein are methods, apparatuses, and systems for synchronization downlink transmission for mixed numerology systems with flexible channel bandwidths. Examples may include using a common numerology region to carry synchronization signals (SSs), wherein the common numerology region is accessible to WTRUs using a first numerology and WTRUs using a second numerology.

Moreover, discussed herein are methods, apparatuses, and systems for improving uplink transmission performance in mixed numerology systems. Examples may include transmitting an uplink control channel using different frequency resources from different antennas. Examples may include lowering a coding rate of control information transmitted in partition edge regions. Examples may include transmitting control information on resources that are not mapped partition edge.

Other examples discussed herein are methods, apparatuses, and systems for reducing uneven SINR distribution across a sub-frame. Examples may include configuring a first one or more symbols of the sub-frame to use a lower order modulation and configuring a remainder of symbols of the sub-frame to use a higher order modulation.

The following description may include examples of variable modulation orders within a resource assignment. In an example, mapping variable modulation orders for a single transport block (TB) assignment may be disclosed.

Figure 3:
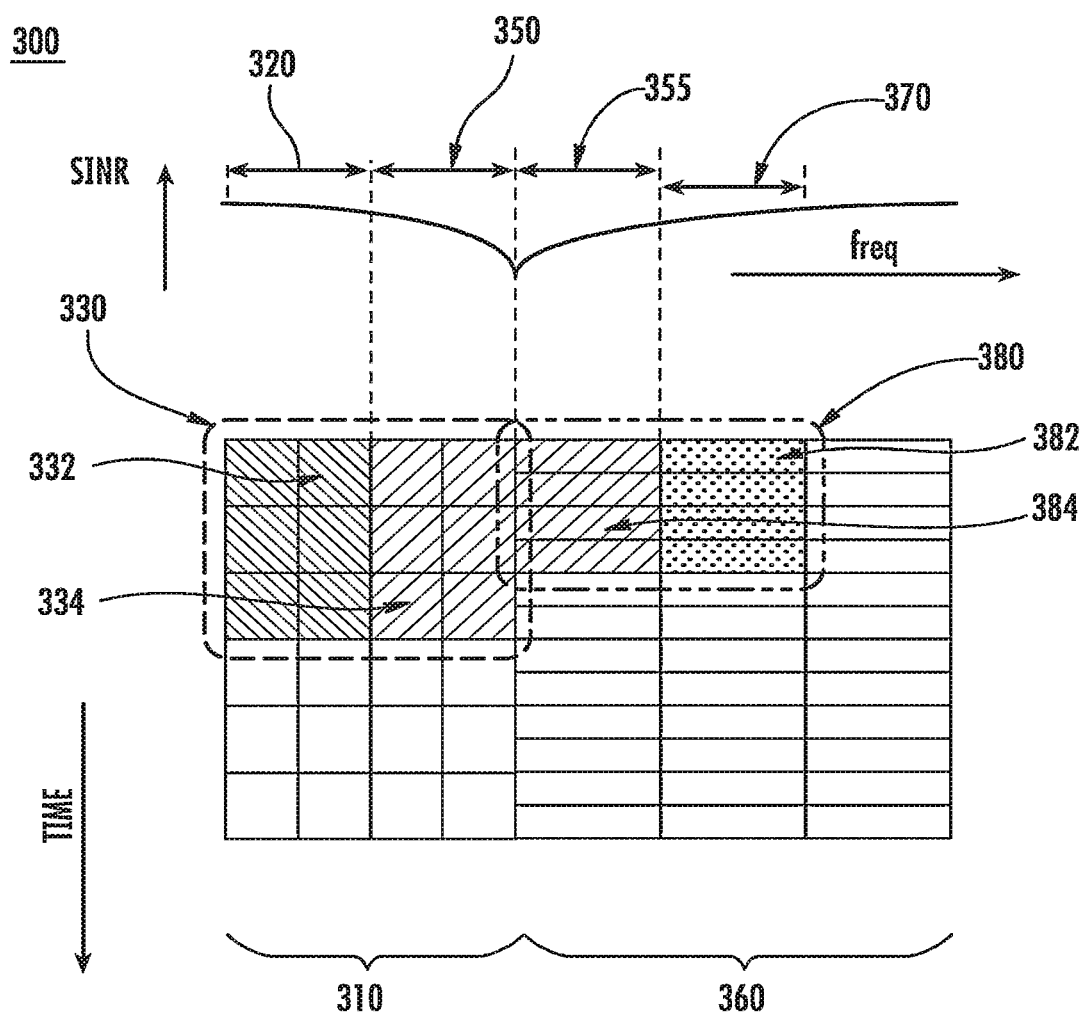
FIG. 3 is a diagram illustrating an example of the use of variable modulation orders within a transport block (TB)

FIG. 3 is a diagram illustrating an example of the use of variable modulation orders within a TB. As shown in an example in diagram 300, for a single TB assignment to a WTRU, the modulation mapping may use a lower order modulation for the resources that are close to the partition edge. In addition, a higher order modulation may be used for the resources closer to the center of the partition and away from the partition edge to mitigate the SINR loss at the partition edge.

In an example shown in FIG. 3, within the resource assignment of one codeword (CW) transmission, which may be transmitted on one TB on a first partition 310 with a first numerology, resources, such as RBs 334, which are close to the partition edge may use a low order modulation to mitigate the SINR loss at the partition edge. In an example, the low order modulation may be Quadrature Phase Shift Keying (QPSK) at the partition edge. The resources further away from the partition edge, such as RBs 332, may be assigned a higher order modulation, such as 16-Quadrature Amplitude Modulation (QAM) or 64-QAM, if the channel conditions allow it. Similarly, for the resource assignment of one CW, which may be transmitted on one TB on a second partition 360 with a second numerology, resources, such as RBs 384 close to the partition edge may use a low order modulation, while the other RBs 382, further away from the partition edge, may use a higher order modulation.

As shown in FIG. 3, frequency in the horizontal axis may be plotted against SINR in the horizontal axis. Such a plot may show that the resources closest to the partition edge on both sides of the partition have a lower SINR than resources further away from the partition edge. This SINR degradation is due to interference as a result of the numerology partition. For example, RBs 334 with an SINR curve 350 and RBs 384 with an SINR curve 355 may have lower SINRs than RBs 332 with an SINR curve 320 and RBs 382 with an SINR curve 370. A similar plot, not shown, may be created with time plotted against SINR for the RBs in FIG. 3. Such a plot may similarly show that the resources closer to the partition edge on both sides of the partition have a lower SINR than resources further away from the partition edge.

Figure 4:
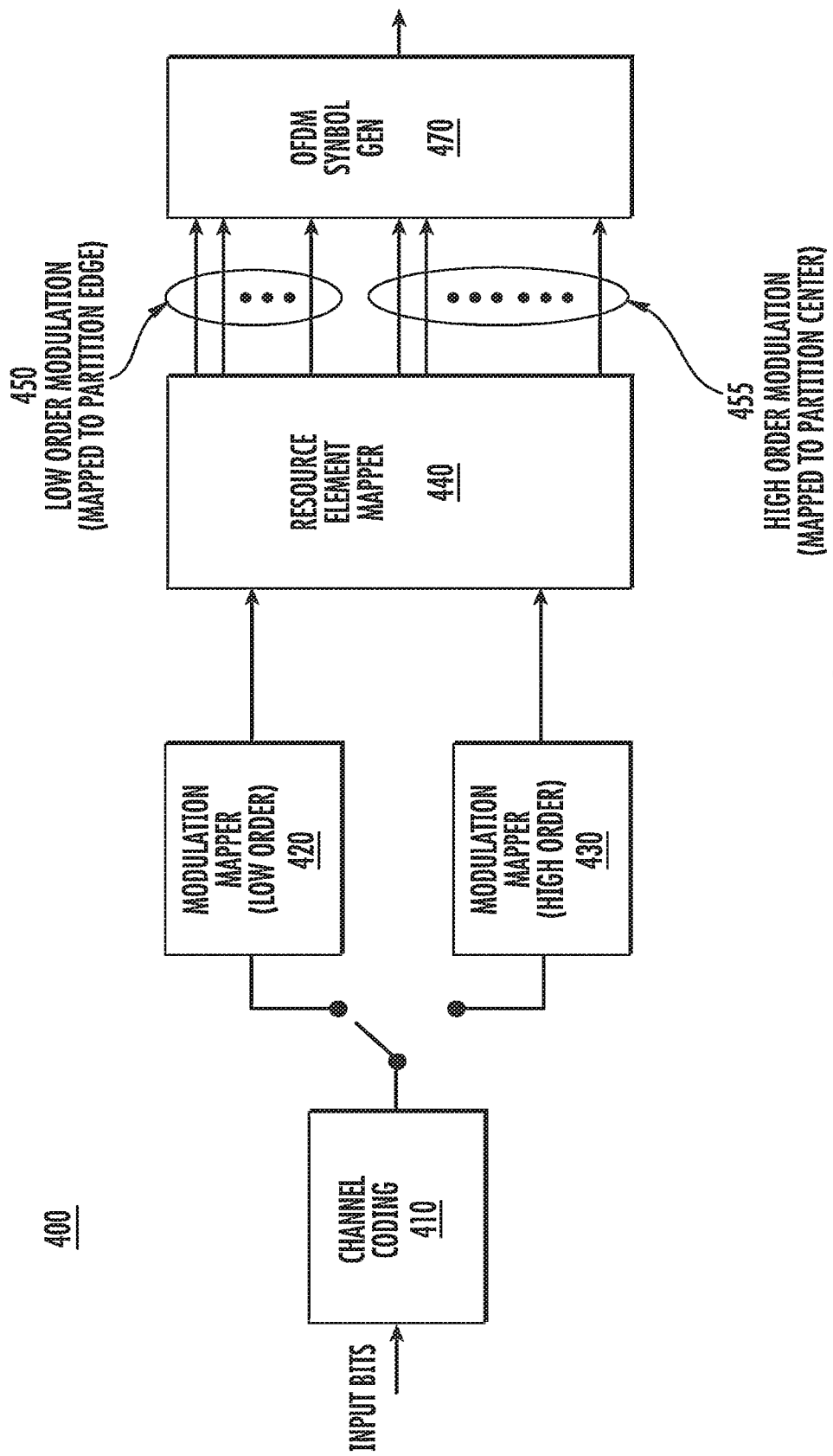
FIG. 4 is a block diagram illustrating an example of a variable modulation order mapping for a single layer, single antenna transmission.

FIG. 4 is a block diagram illustrating an example of a variable modulation order mapping for a single layer, single antenna transmission. Mapping different modulation orders to different RBs, as described in the above example, may be achieved for single layer transmission using the example shown in block diagram 400. Block diagram 400 also shows an example of mapping different modulation orders to different RBs for single antenna transmission.

For example, input bits may be input into a channel coding block 410 for coding. The coded bits available at the output of the channel coding block 410 may be mapped to modulation symbols using a "Modulation Mapper" block. For example, a subset of the coded bits may be processed by a high order modulation mapper block 430 and mapped to the IFFT input to the sub-carriers close to the partition center 455, when output by a resource element mapper 440. The remaining subset of the coded bits may be processed by the low order modulation mapper block 420 and mapped to the IFFT input to the sub-carriers close to the partition edge 450, when output by a resource element mapper 440. An OFDM symbol generator 470 may then receive the mapped bits and generate corresponding OFDM symbols.

Figure 5:
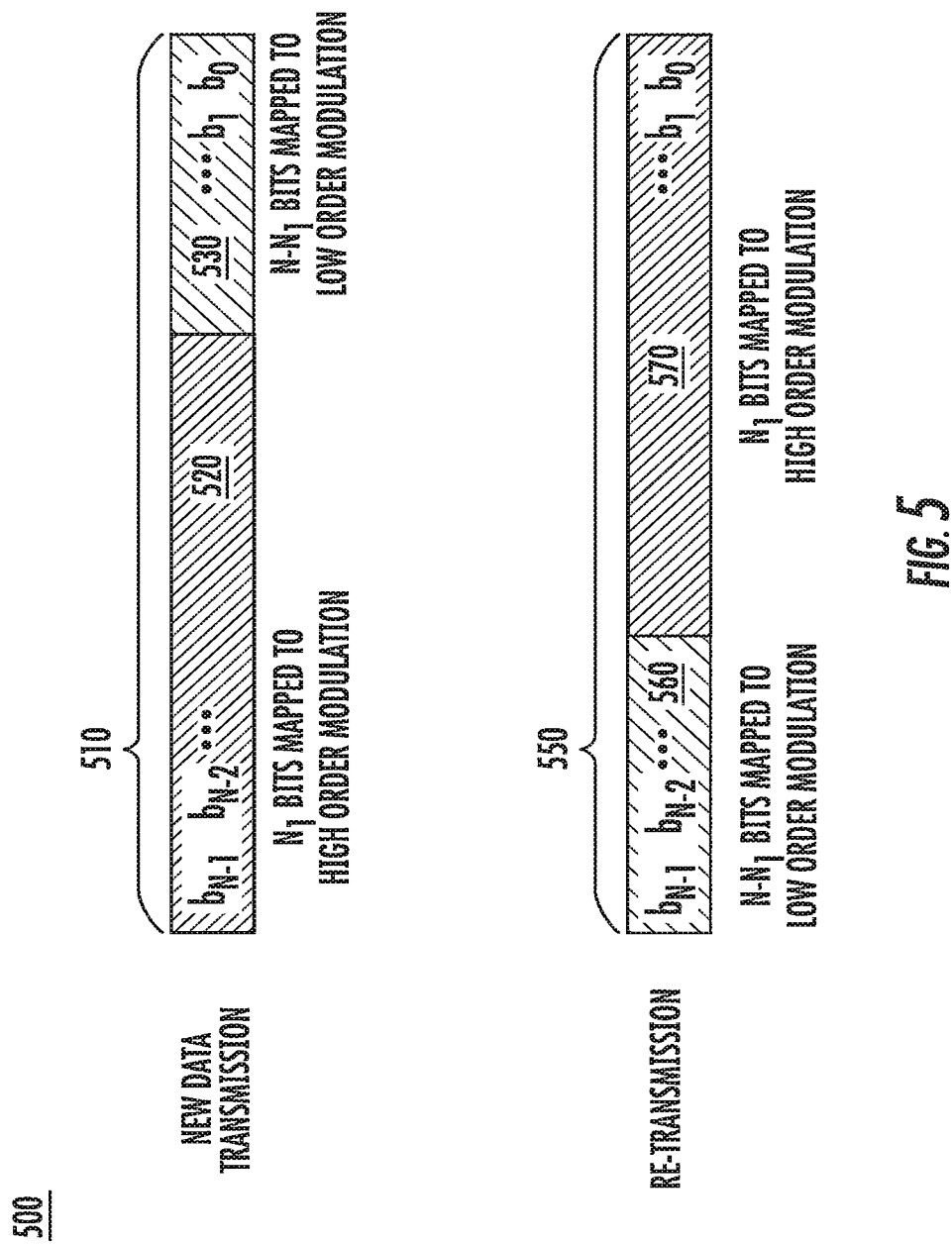
FIG. 5 is a diagram illustrating an example of changing the modulation mapping for re-transmission.

FIG. 5 is a diagram illustrating an example of changing the modulation mapping for re-transmission. When re-transmissions of the transport block are needed, the transmitter may change the mapping order of the coded bits. In an example, the transmitter may change the mapping order of the coded bits in order to randomize the distribution of the potential errors across the transport block. For example, the subset that was mapped to the partition edge using a low order modulation scheme for the new transmission may be mapped to the partition middle (which may be away from the partition edge) using a higher order modulation scheme for a re-transmission. In this way, during the re-transmission, a different sub-set of the transport block bits may be subject to lower SINR (which may be at the partition edge), as compared to the sub-set of bits subject to low SINR during the first transmission. This may result in randomizing the distribution of the bit errors across the transport block, which increases the diversity gain. In this way, different bits may be in error in the first transmission compared with the re-transmission. The new transmission may be a transmission of a codeword and the re-transmission may be a re-transmission of the codeword.

In an example shown in diagram 500, for a new data transmission, the first $N_1$ bits 520 of the coded block of a codeword 510 may be mapped to a higher order modulation scheme, and the last $N-N_1$ bits 530 of the coded block of the codeword 510 may be mapped to a lower order modulation scheme. For the re-transmission, for example when the same amount of resources are allocated as for the new data transmission, the first $N-N_1$ bits 560 of the coded block of the codeword 550 may be mapped to the lower order modulation scheme, while the last $N_1$ bits 570 may be mapped to the higher order modulation scheme.

In this way, the number of bits using each modulation scheme remains the same in the new data transmission of a codeword and in the re-transmission of the codeword. For example, both $N-N_1$ bits 530 and $N-N_1$ bits 560 contain the same number of bits and may be transmitted using the lower order modulation scheme. Likewise, $N_1$ bits 520 and $N_1$ bits 570 contain the same number of bits and may be transmitted using the higher order modulation scheme. The change in the sequential processing of the coded bits, for example, high order modulation followed by low order modulation for a new data transmission and low order modulation followed by high order modulation for a re-transmission, may be either pre-defined, or signaled within the DCI.

FIG. 6 is a flowchart diagram of an example of changing the modulation mapping for re-transmission. In an example shown in flowchart 600, a WTRU may map a first set of bits in a first codeword to a higher order modulation scheme and a second set of bits in the first codeword to a lower order modulation scheme 620. The WTRU may then transmit the first codeword 630. An eNode-B may then receive the first codeword. Further, the WTRU may determine that data of the first codeword is to be re-transmitted on a second codeword 640, which may contain the same number of bits as the first codeword. Then, the WTRU may map a first set of bits in the second codeword to the lower order modulation scheme and a second set of bits in the second codeword to the higher order modulation scheme 650. The first set of bits of the second codeword may contain the same number of bits as the second set of bits of the first codeword and may contain at least a subset of data in the first set of bits of the first codeword. The WTRU may then transmit the second codeword 660. The eNode-B may then receive the second codeword.

In a further example, the WTRU may receive an assignment message from an eNode-B including instructions regarding partition determination and resource assignment. As a result, the WTRU may determine at least two partitions of bandwidth for wireless communication based on the assignment message, wherein each of the at least two partitions have differing symbol periods, differing subcarrier spacing or both. Further, the WTRU may assign RBs of the at least two partitions based on the assignment message, wherein RBs of a partition close in at least one of time resources and frequency resources to an adjacent partition are assigned the lower modulation scheme, and wherein the first codeword is transmitted using assigned RBs. In an example, a first partition may have a first numerology and a second partition may have a second numerology.

Further, a base station, such as an eNode-B, may determine that data of the first codeword is to be re-transmitted based on a low SINR ratio of the transmitted first codeword. In an example, the eNode-B may make the determination based on other considerations in addition to or instead of the SINR ratio. The eNode-B may transmit a message to the WTRU including instructions to re-transmit data of the first codeword. The WTRU may then determine that data of the first codeword is to be re-transmitted is based on receiving the message from the eNode-B. In addition, the mapping the bits of the codewords may be based on at least one of pre-defined processing, dynamically signaled processing and processing signaled in DCI.

In another example, an eNode-B may map a first set of bits in a first codeword to a higher order modulation scheme and a second set of bits in the first codeword to a lower order modulation scheme. The eNode-B may then transmit the first codeword. A WTRU may then receive the first codeword. Further, the eNode-B may determine that data of the first codeword is to be re-transmitted on a second codeword, which may contain the same number of bits as the first codeword. Then, the eNode-B may map a first set of bits in the second codeword to the lower order modulation scheme and a second set of bits in the second codeword to the higher order modulation scheme. The first set of bits of the second codeword may contain the same number of bits as the second set of bits of the first codeword and may contain at least a subset of data in the first set of bits of the first codeword. The eNode-B may then transmit the second codeword. The WTRU may then receive the second codeword.

In an additional example, the eNode-B may determine at least two partitions of bandwidth for wireless communication, wherein each of the at least two partitions have differing symbol periods, differing subcarrier spacing or both. Further, the eNode-B may assign RBs of the at least two partitions, wherein RBs of a partition close in at least one of time resources and frequency resources to an adjacent partition are assigned the lower modulation scheme, and wherein the first codeword is transmitted using assigned RBs. In an example, a first partition may have a first numerology and a second partition may have a second numerology. In an example, the eNode-B may generate and transmit, to the WTRU, an assignment message including instructions regarding the partition determination and the resource assignment.

Moreover, an eNode-B may determine that data of the first codeword is to be re-transmitted based on a low SINR ratio of the transmitted first codeword. In an example, the eNode-B may make the determination based on other considerations in addition to or instead of the SINR ratio. The eNode-B may then re-transmit the data on the second codeword. In addition, the mapping the bits of the codewords may be based on at least one of pre-defined processing, dynamically signaled processing and processing signaled in DCI.

The following examples may include metrics used for variable modulation order per TB. In examples, if a base station assigns both partition edge and partition center resources, such as RBs, for a single TB transmission to a WTRU, the base station may select the MCS based on the channel state reports, or more specifically the channel quality indicators (CQIs) reported by the user. The granularity of CQI reported may depend on the type of channel state reports, such as aperiodic vs. periodic, wideband vs. WTRU-selected.

For example, the WTRU may provide a single CQI report based on the entire cell bandwidth, as in the case of an aperiodic wideband report. In another example, the WTRU may divide the total system (for example, component carrier) bandwidth into several parts and provide the wideband CQI for each bandwidth part as well as the best subset of RBs (or subband) within that bandwidth part. In yet another example, the WTRU may choose to report the CQIs for only a certain set of subbands. The choice of subbands may be WTRU-selected, in which case these subbands may be its best subbands, or network configured.

If the base station assigns both partition edge and partition center resources (such as RBs or REs) for a single TB transmission from a WTRU, the base station may select the MCS based on the channel state reports or channel measurements. The base station may measure the channel by using reference signals transmitted by the WTRU. For example the base station may measure sounding reference signals transmitted by the WTRU. The transmission parameters of the reference signals transmitted on different parts of the partition may be different. For example, reference signals transmitted on the edges may have higher power than the reference signals transmitted in the middle of the partition.

In addition to channel state reports and/or measurements, the base station may utilize various other parameters when determining the choice of modulation order for each RB or group of RBs. The other parameters may include, for example, a set of available resources, amount of data that needs to be transmitted, and the like. Depending on the availability and granularity of the CQI reports, as described above, the base station may have the flexibility to utilize a wide variety of CQI reports as well as the total number of resources (RBs) available when selecting the modulation order for each set (for example, partition edge or partition center) of resources for this TB. The CQI reports may include, for example, wideband and best subband CQIs of each bandwidth part and the like.

The base station may choose to utilize the same modulation order for both partition edge and partition center resources if, for example, the group of RBs assigned in each partition have similar CQI values. This may occur if the resources assigned in each partition are amongst the best subbands as described above, or if wideband CQIs reported for each partition are utilized and the reported wideband CQIs for each partition are similar.

In another scenario, for example when resource availability is not a constraining factor, or if the base station only has a small amount of data to transmit, it may select the lower, more conservative MCS for both partition edge and partition center resources. In such a scenario, the MCS may be chosen based on CQI of the boundary edge resources.

The following examples may include signaling the variable modulation order to the WTRU. In addition, examples which follow may include calculating the TBS for assignments with variable modulation order.

A WTRU or group of WTRUs may be configured semi-statically, for example, via higher layer signaling, with one or more of the following parameters. In an example, a parameter may be a region in the frequency domain, for example, RBs, where a particular modulation type, for example QPSK, may be used. A parameter may be a particular modulation type to use, for example QPSK. A parameter may be enabling or disabling the use of multiple modulation types for a transport block.

Using control signaling, such as, for example the DCI, the base station may dynamically signal one or more of the following information to the WTRU or group of WTRUs. For example, information from which the WTRU may determine the coding rate or the transport block size (TBS) may be signaled by the base station. In another example, information from which the WTRU may determine at least one modulation type may be signaled. In a further example, information from which the WTRU may determine the RB, or resources, for the assigned TB may be signaled.

For example, when a single modulation order is utilized for the TB, existing L1/L2 control signaling may be used to inform the WTRU of the various transmission parameters. The transmission parameters may include, for example, MCS and RB allocation. For example, DCI format 1 may be utilized in the case where assigned partition center and partition edge resources are non-contiguous, whereas the more compact DCI format 1A may be utilized for the case where the assigned resources are contiguous.

Figure 7:
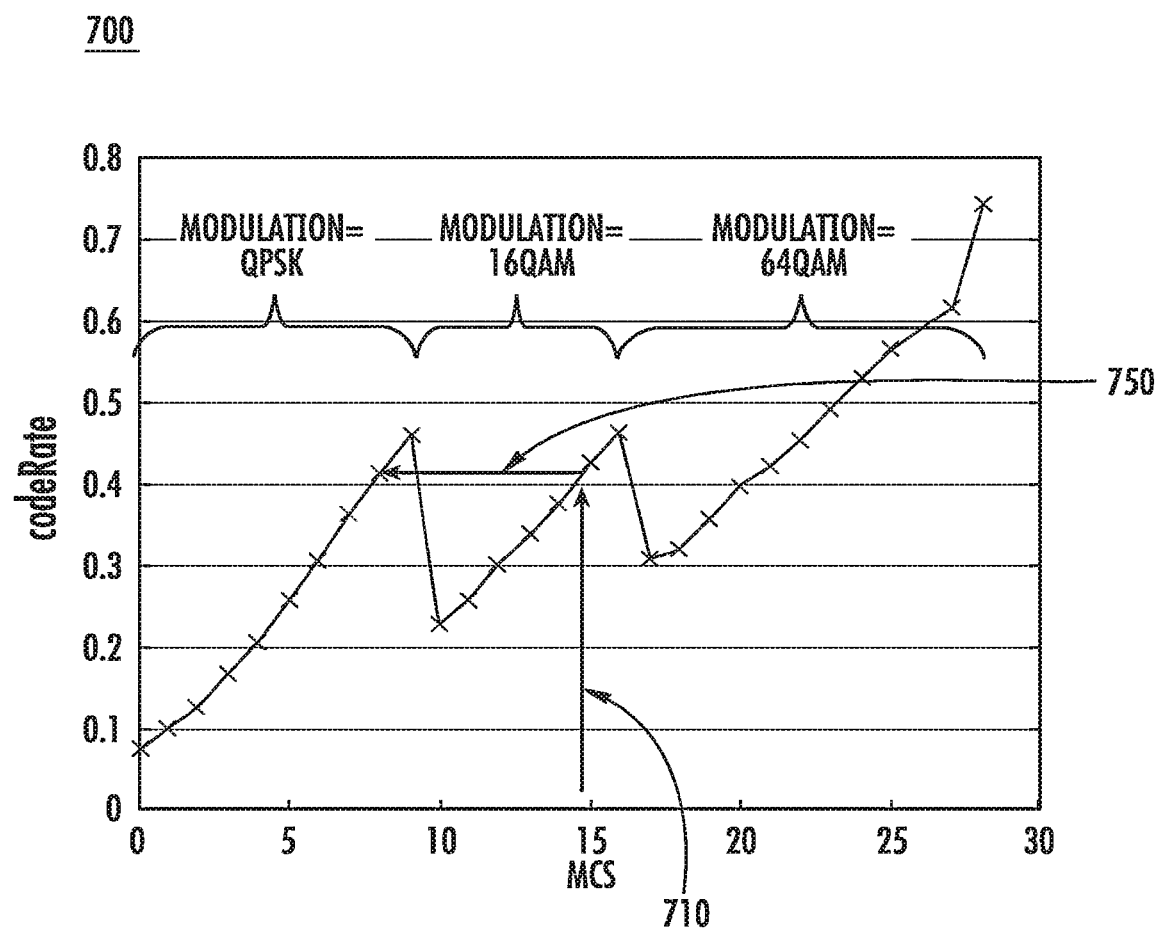
FIG. 7 is a chart illustrating an example of signaling the offset for modulation order selection for partition edge resources.

FIG. 7 is a chart illustrating an example of signaling the offset for modulation order selection for partition edge resources. In an example shown in chart 700, when the base station selects two modulation orders for the resources, the control information may carry the MCS information for the partition center resources 710. The information for the modulation order of the partition edge resources 750 may be signaled in the same message, as an offset to the MCS information of the center resources. In an example, the offset may be represented using a N-bit value (for example, a bit map), whereby a zero value for the offset indicates a constant modulation order within the TB and the non-zero values point to the specific row of the modulation table for PDSCH to be used for the partition edge resources, as shown in FIG. 7. For example, the signaled MCS information for the partition center resources 710 may include a modulation order of 4 and a code rate of about 0.4. Further, the signaled offset for the modulation order of the partition edge resources 750 may include a modulation order of 2 and a code rate of about 0.4. In an example, the standard mapping of the MCS to code rate and modulation type may be used.

In another example, when the base station selects two different modulation orders for the resources within the same TB, the base station may use L1/L2 control signaling to signal the MCS for the resources mapped to the center or the partition and the MCS for the resources mapped to the partition edge. In examples, the resources may be resource blocks or resource block groups.

In another example, the base station may signal the MCS for the resources mapped to the center of the partition and may signal the modulation order and the coding rate for the resources mapped to the partition edge. The base station may signal the MCS for the center RBs and only signal the coding rate for the pre-configured RBs if, for example, the WTRU is semi-statically configured to use a particular modulation type in a particular region in the frequency domain. In this case, the WTRU may use the resource allocation to autonomously determine if any of the allocated RBs are in the semi-statically configured region. If so, it may use the semi-statically configured modulation order to map/de-map the symbols, calculate the TBS for the forward error correction (FEC) encoder/decoder processing, and the like.

In another example, the DCI that carries the MCS signaling for the center RBs and for the edge RBs may signal the resource block allocation. For example, the DCI may indicate the number of and location of partition edge RBs that may be configured for a lower order modulation.

When a WTRU is either dynamically signaled or semi-statically configured to use multiple different modulation orders in a transport block, one or more of the following may apply, which may use parameters. The WTRU may determine whether to use one modulation type or multiple modulation types for transmitting the data in the UL or for receiving the data in the DL. In an example, the multiple modulation types may be two modulation types. The WTRU may make the determination based on at least one of the following: whether or not use of multiple modulation types has been enabled, and the location of the RBs (for example, for the frequency location). For example, the WTRU may use multiple modulation types when the frequency location of some of the allocated RBs is in a particular location. The particular location may be the edge of the band, within x kilohertz (kHz) from the edge of the band, or configured by higher layer signaling.

The WTRU may use at least one of the transmission parameters that may be signaled to determine the transport block size, for example, for the FEC coding chain, decoding chain, or both. The transmission parameters may include at least one of the following: an MCS for a first set of RBs (for example, the center RBs), an MCS for a second set of RBs (for example, the edge RBs), a modulation order for a second set of RBs, a coding rate corresponding to the bits mapped to the second set of RBs, an offset of the coding rate for the second set of RBs with respect to the coding rate corresponding to the first set of RBs, and a resource-block allocation. The resource-block allocation may be contiguous and the WTRU may autonomously determine which of the allocated RBs may be in the second set of RBs. In an example, the second set of RBs may be edge RBs. The resource-block allocation may be non-contiguous and the WTRU may use separate indications for the RB allocation for the first set of RBs and for the second set of RBs.

For example, if the base station signals the MCS for the first set of RBs, the MCS for the second set of RBs, and the RB allocation, the WTRU may determine the number of RBs in the first set, the number of RBs in the second set, and use a pre-defined mapping to determine the transport block size that may be supported by the first set of RBs and the transport block size that may be supported by a second set of RBs to calculate the effective TBS that may be used.

In another example, if the base station signals the MCS for the first set of RBs and the modulation order for the second set of RBs, the WTRU may determine the number of RBs in the first set, the number of RBs in the second set, and may use a pre-defined mapping to determine the transport block size that may be supported by the first set of RBs. The WTRU may then determine the approximate coding rate supported by the first set of RBs, and use that first coding rate, in conjunction with the modulation type and the number of RBs in the second set, to calculate the TBS that may be supported in the second set of RBs. The TBS for the second set of RBs may be then selected from a mapping table, as the nearest TBS smaller than the value calculated before. One of ordinary skill in the art will appreciate that other examples of how the WTRU may make the determination of the total TBS to be used jointly for the first and the second set of RBs are possible, and still consistent with this invention.

In the examples and embodiments described herein, MCS may refer to the modulation and coding set, which may be used to signal to the WTRU the modulation order and a parameter that may be used to derive the TBS and/or the coding rate. The parameter may be, for example, I_TBS. The MCS is used in non-limiting examples. Other information may be substituted for MCS to signal to the WTRU the modulation order, the coding rate, and/or the TBS, and still be consistent with examples described herein.

In examples, FDM of multiple codewords in a TTI may be performed. In an example, two codewords may be assigned to the same spatial layer, and multiplexed in an FDM fashion, for example when a large amount of data needs to be transmitted to a node, which may require a large number of RBs to be assigned to that transmission. A large amount of data may need to be transmitted to a node in several examples, such as for DL from a base station to a WTRU, for UL from a WTRU to the base station, or for WTRU to WTRU links. In an example, the first codeword may be mapped in the frequency domain to the RBs at the partition-edge and may be configured to use a robust MCS. This may mitigate the SNR loss due to the inter-numerology interference. The second codeword assigned to the same WTRU or node may be mapped in the frequency domain to the RBs located toward the center of the numerology partition and may be configured to use a more aggressive MCS, which may help achieve higher throughput. The more aggressive MCS may include, for example higher order modulation, higher coding rate, and the like.

Figure 8:
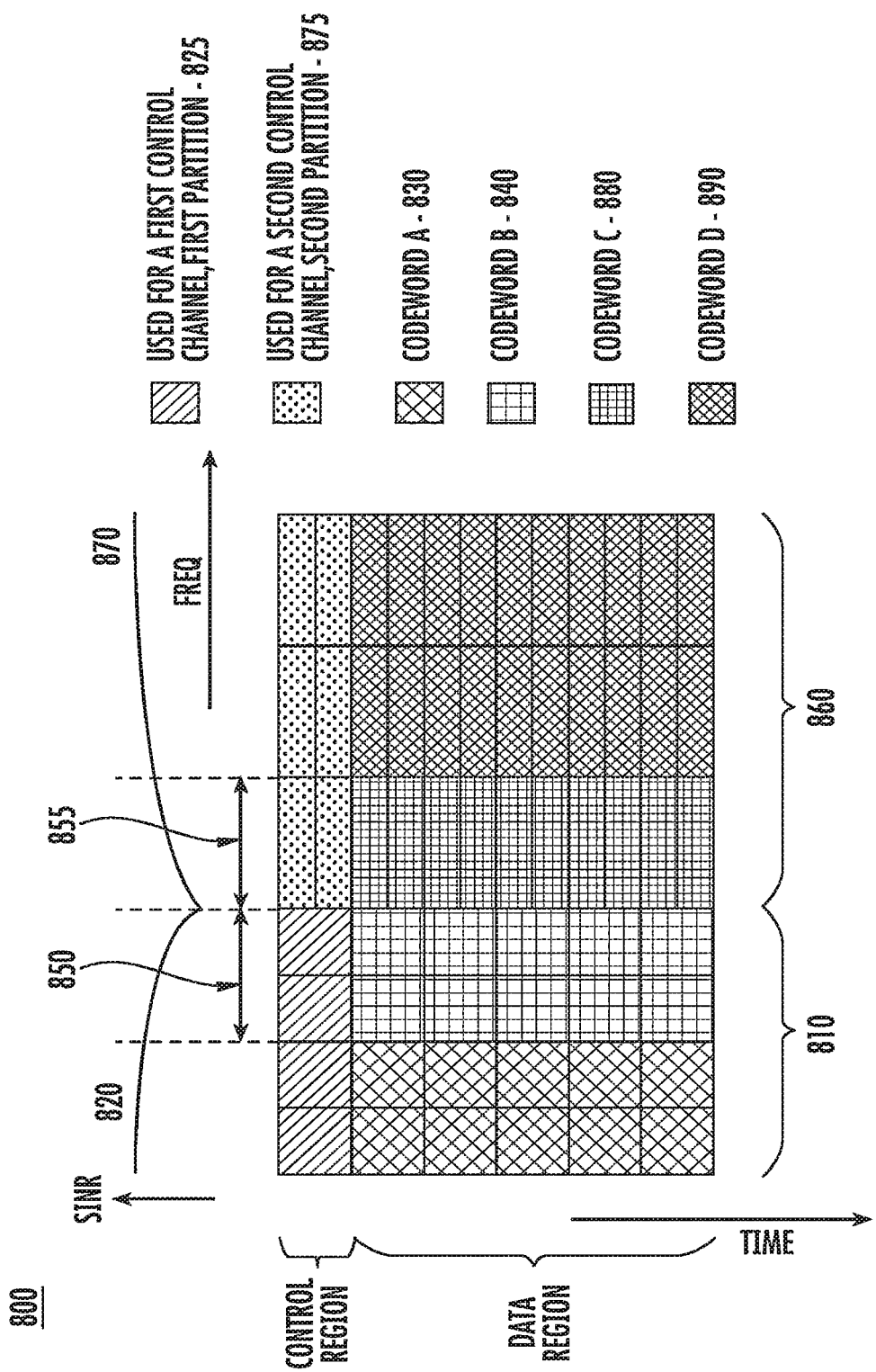
FIG. 8 is a diagram illustrating an example of Frequency-Division Multiplexing (FDM) transmission of two codewords on a single layer.

FIG. 8 is a diagram illustrating an example of FDM transmission of two codewords on a single layer. As shown in an example in diagram 800, two adjacent partitions may use different numerologies. In this example, a first WTRU may be assigned data in a first partition 810 using a first numerology, and a second WTRU may be assigned data on a second partition 860 using a second numerology. At the boundary between the partitions 810, 860, the SINR may decrease. This decrease is shown in FIG. 8, which shows frequency in the horizontal axis may be plotted against SINR in the horizontal axis, in a similar fashion to that shown in FIG. 3. Such a plot may show that the resources closest to the partition edge on both sides of the partition have a lower SINR than resources further away from the partition edge. This SINR degradation is due to interference as a result of the numerology partition. For example, Codeword B 840 with an SINR curve 850 and Codeword C 880 with an SINR curve 855 may have lower SINRs than Codeword A 830 with an SINR curve 820 and Codeword D 890 with an SINR curve 870. A similar plot, not shown, may be created with time plotted against SINR for the Codewords 830, 840, 880, 890. Such a plot may similarly show that the resources closer to the partition edge on both sides of the partition have a lower SINR than resources further away from the partition edge.

As shown in FIG. 8, the first WTRU may be assigned Codeword B 840 that is mapped in the frequency domain to the RB adjacent to the partition boundary and uses a robust MCS selection. The robust MCS selection may be, for example, a low order modulation, such as QPSK, and a low coding rate. At the same time resources (such as in the same TTI), the first WTRU may also be assigned Codeword A 830 that is mapped in the frequency domain in the center of the partition and may use an aggressive MCS selection. The aggressive MCS selection may be, for example a higher modulation order, such as 16-QAM, 64-QAM or higher, and a high coding rate. Similarly, for the second WTRU, which may be assigned data using the second numerology, Codeword C 880 may be mapped close to the partition boundary, and may use a robust MCS selection. Codeword D 890 that may also be assigned to the second WTRU may be mapped closer to the center of the partition and may use a more aggressive MCS selection. Control channels may use a more robust MCS selection. For example, a first control channel may use control region resources in the first partition 825 and may use a more robust MCS selection. Also, a second control channel may use control region resources in the second partition 875 and may similarly use a more robust MCS selection.

In an example, the parameters of the second codeword may be derived from the parameters of the first codeword. For example, the WTRU may be semi-statically configured to use a certain number of RBs located in a certain part of the system bandwidth. The certain part of the system bandwidth may be, for example, 4 RBs at the band edge. These resources may be used for mapping the second codeword, and thus the base station may only need to signal the MCS for the second codeword, in addition to the control information for the first codeword.

In an example, some portions of a channel bandwidth may be allocated to re-transmissions of codewords that are not received successfully. For example, the edges of the channel partitions, where partitions may be configured to be used for the transmission of waveforms with different numerologies, may be allocated for re-transmissions. The size of the partition edge may be determined by a central controller, such as a base station, and signaled in a control channel, configured, or both. The size of the partition edge may be expressed in terms of Hertz (Hz), number of subcarriers, number of resource blocks, or another measure.

In another example, some portions of a channel bandwidth may be allocated to transmit additional bits of a codeword. The information bits of a data stream may be encoded and later processed by a rate matching operation which selects certain bits from the output of the channel encoder, where the selected bits may be further processed for transmission. One partition of a channel bandwidth may further be divided into two or more sub-partitions. For example, one or more of the edges of the partition may constitute a sub-partition. The number of bits at the output of the rate matching block may be decided based on the resources available in a subset of sub-partitions.

For some WTRUs, the rate matching process may be configured to produce additional bits where the additional bits may be transmitted in those resources of other sub-partitions. For example, if the channel bandwidth is divided into two partitions as shown in FIG. 8, each partition may be further divided into two sub-partitions where one of the sub-partitions consists of resources at the edge of a partition. In an example, the edge of a partition may have N subcarriers while the remaining part has M subcarriers. The rate matching operation may be performed such that the number of bits at the output of the rate matching may fit into M subcarriers. In one method, the rate matching operation may output additional bits that may fit into N subcarriers.

In examples, a mixed Cell-Specific Reference Signal (CRS) and DMRS based transmission mode may be used. In a transmission with mixed numerology, the inter-numerology interference may impact the quality of transmission especially at the band edge, or partition edge, of a given service allocation where there is a transition from one numerology to another. The resulting interference may be mutual, however it may have a larger impact from the service with a larger subcarrier spacing on the service with a smaller subcarrier spacing.

Figure 9:
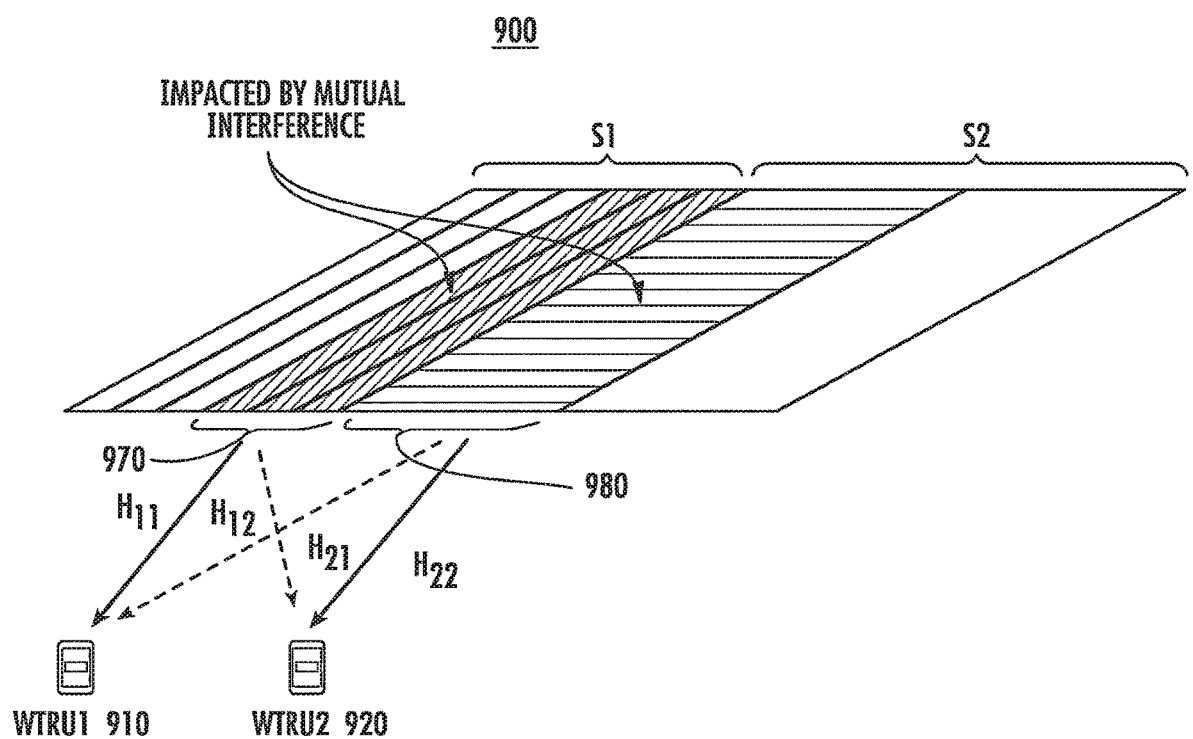
FIG. 9 is a diagram illustrating an example of an interference model for the band-edge.

FIG. 9 is a diagram illustrating an example of an interference model for the band-edge. As shown in an example in diagram 900, there may be a band-edge or a partition-edge between two services. One way to compensate for the incurred loss at the band-edge may be to take advantage of WTRU-specific beamforming by employing DMRS-based beamforming on the band-edge regardless of the transmission mode in the remaining part of the band. The beamforming on the band-edge may be done by both services to minimize the interference 970, 980 on the direction of the WTRU of the other service and maximizing the transmission efficiency for the service's own WTRU. FIG. 9 shows an example interference model for the case for two adjacent services, namely, S1 and S2 and having different subcarrier spacing.

For the example case shown in FIG. 9, a transmit beamforming procedure can be devised as follows. A WTRU1 910 and a WTRU2 920 may perform channel measurements to provide implicit or explicit information. On channel response $H_{11}$, there may be a channel response for WTRU1 910 for its desired service $S_1$. The desired service $S_1$ may be transmitted on a numerology 1. On channel response $H_{21}$, there may be a channel response for WTRU1 910, from the interference service $S_2$. Service $S_2$ may be transmitted on a numerology 2. On channel response $H_{12}$, there may be a channel response for WTRU2 920, from the interference service $S_1$, transmitted on numerology 1. On channel response $H_{22}$, there may be a channel response for WTRU2 920 for its desired service $S_2$, transmitted on numerology 2. In some cases, it may be assumed that $H_1=H_{11}=H_{21}$ and $H_2=H_{12}=H_{22}$, for example when the difference between the subcarrier spacing is not large.

Using the measurements provided by the WTRUs, the base station may perform beamforming to: minimize the interference generated by the service Si to the other service, maximize the SNR of the intended transmission of service Si, minimize interference generated by service Si while constraining the SNR of the intended transmission of service Sj to be above a certain threshold, or maximize the intended transmission of service Si, while constraining the interference generated by service Sj to be below a certain threshold.

The base station may perform the beamforming to benefit both WTRUs, or, for example, to maximize the intended $S_1$ for WTRU1 910 while minimizing the interference from $S_2$. Different beamforming mechanisms may be used, and an exemplary approach may be based on maximizing the signal-to-leakage-noise (SLNR) ratio, $$SLNR_1 = \frac{\|H_1 w_1\|^2}{M_1 \sigma_1^2 + \|H_2 w_1\|^2} \qquad \text{Equation (1)}$$

where $M_1$, $\sigma_1^2$ and $w_1$ represent a number of antennas at the WTRU1 910, a noise variance and a beamforming vector used by $S_1$, respectively. The beamforming vector $w_1$ may be defined as $$w_1 \propto \text{max. eigenvector}\left((M_1\sigma_1^2 I + H_2^H H_2)^{-1} H_1^H H_1\right) \qquad \text{Equation (2)}$$

It should be noted that a similar solution for $w_2$ may be derived.

In another example, WTRU1 910 may use receive beamforming to mitigate the impact of the interference on the band-edge. To design the receiver beamforming, WTRU1 910 may require the direction of the interference created by the other S2. One way to estimate the spatial direction of the interference on S1 may be as follows. WTRU1 910 may be configured to perform CSI-RS measurements on an inner subband immediately next to the band-edge. The base station may stop transmission on the band-edge of S1. WTRU1 910 may now be configured to perform CSI-RS measurements on the band-edge of S1. WTRU1 910 may compare the measurements from the first step against the measurements in the third step to estimate the direction of the beamforming vector intended for the adjacent interfering band.

In a further example, the WTRU may be configured to perform CSI-RS measurement on the band-edge. The WTRU may report the level of the observed interference to estimate the CQI.

In examples, power boosting for REs may be used. The power of the cell specific reference signals may be adjusted according to the selectivity and the quality of the channel to enable an accurate channel estimation. In LTE, the ratio between the CRS and data REs may be a cell specific parameter that can be changed to enable better channel estimation.

In a system with mixed numerology, the transmission of a system with a wider subcarrier spacing may have a larger impact on the performance of a system with a smaller subcarrier spacing, thereby causing interference on both data signals and reference signals. One way to reduce the impact of interference on the accuracy of channel estimation may be to introduce additional power offset settings for band-edge transmissions. Therefore, a WTRU may be configured to use different sets of power settings for demodulation of reference signals required for channel estimation. The power boosting for the reference signal may be applied on all the reference REs located on the band-edge. Therefore, a WTRU may be configured to use different sets of power settings for demodulation and proper use of reference REs located at the band-edge and inner RBs.

In another example, another way to reduce the impact of the interference, may be to apply a power offset for all the REs located in the RB or RBs of the band-edge. The increased allocated power for band-edge power boosting may be supported from the power of inner RBs that are not interfered by an adjacent service. Therefore, a WTRU may be configured to use different sets of power settings for demodulation of all REs located at the band-edge and inner RBs. In case of additional power boosting for reference signals, a WTRU may need to apply the additional power offset for demodulation of reference REs. The power boosting techniques are applicable to any node that is transmitting on a band partition with varying qualities, including the base station, WTRUs, and the like.

In examples, downlink synchronization to support mixed numerology and flexible channel bandwidth may be used. In a cellular system, synchronization signals are typically used for the WTRU to achieve frame, sub-frame, slot, and symbol synchronization, identify the center of the channel, and extract the physical (PHY) layer cell identity (ID). In LTE, there may be two types of synchronization signals: a primary synchronization signal (PSS) and a secondary synchronization signal (SSS). The PSS may be used to achieve sub-frame, slot, and symbol synchronization in the time domain, identify the center of the channel bandwidth in the frequency domain, and deduce a pointer towards 1 of 3 Physical layer Cell Identities (PCIs). The SSS may be used to achieve radio frame synchronization and deduce a pointer towards 1 of 168 PCI groups. These synchronization signals may be placed in a set of resource elements that are at the center of the channels with certain rate.

Systems that are capable of deploying different OFDM numerologies may require synchronization with some of the WTRUs in the network and, therefore, a synchronization signal (SS) and corresponding mechanisms. Since the SS may be used by WTRUs with mixed numerology capability, it would be desirable to use one of the numerologies, which may be referred to as a common numerology, for the SS. The resources that carry the SS could also carry other signals that need to be broadcast to all, or a group of, WTRUs. The other signals may include, for example, cell specific reference signals. The common numerology may also carry WTRU specific signals for reliable transmission and reception.

Figure 10A:
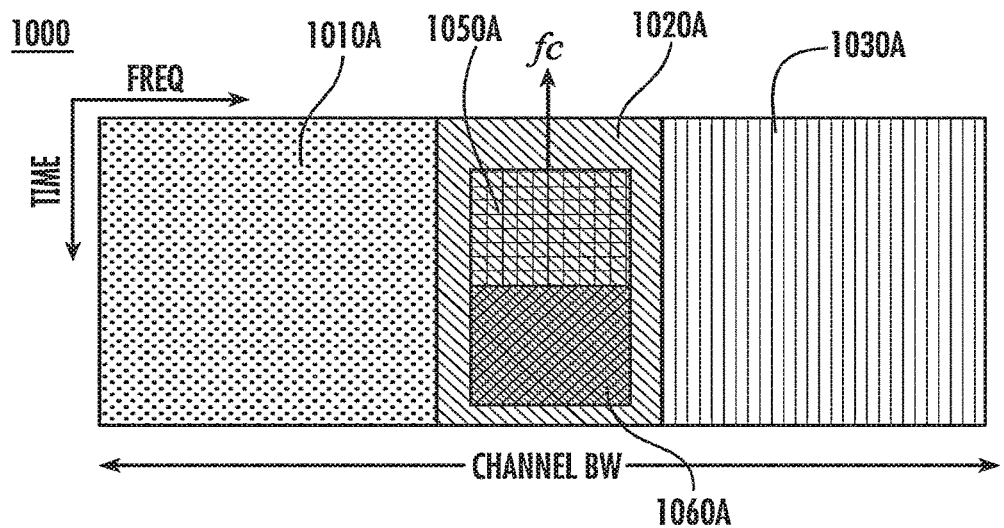
FIGS. 10A and 10B are signaling diagrams illustrating examples of the placement of synchronization signals in a mixed numerology time-frequency grid.
Figure 10B:
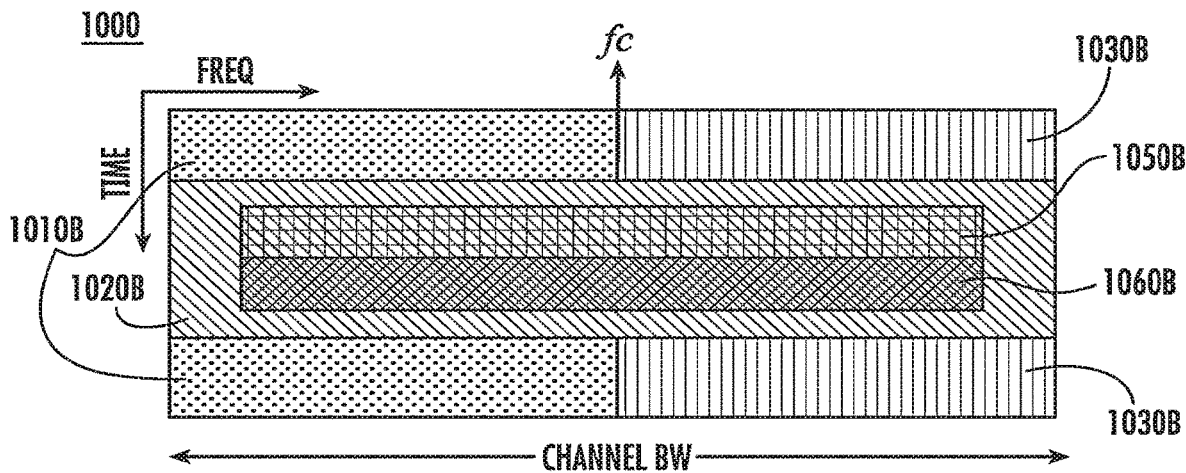

FIGS. 10A and 10B are signaling diagrams illustrating examples of the placement of synchronization signals in a mixed numerology time-frequency grid. Examples in signaling diagram 1000 are shown on a grid with frequency in the horizontal axis, time in the vertical axis and a frequency center of the channel shown by fc. Specifically, examples in FIGS. 10A and 10B show two possible ways to allocate the resources for signals, including PSS and SSS, using a common numerology and its coexistence with other numerologies in a channel. Although only two other numerologies with symmetric allocation patterns are shown, there may be many different numerologies and patterns in general.

As shown in an example in FIG. 10A, a first numerology 1010A may be used by a first group of WTRUs in a first part of a channel bandwidth and a second numerology 1030A may be used by a second group of WTRUs in a second part of the channel bandwidth. In an example, the first numerology 1010A may be used by URLLC WTRUs and the second numerology 1030A may be used by mMTC WTRUs. A common numerology 1020A may be used by an SSS 1050A and a PSS 1060A. In an example, the common numerology 1020A may be used in a third part of the channel bandwidth between the first part of a channel bandwidth and the second part of a channel bandwidth. In an example, the common numerology 1020A may be the same numerology as one of the first numerology 1010A and the second numerology 1030A. In another example, the common numerology 1020A may be a third numerology and may be different from the first numerology 1010A and the second numerology 1030A. In an example, the common numerology 1020A may be a fixed numerology. Further, the common numerology 1020A may be independent of the first numerology 1010A and the second numerology 1030A.

As shown in an example in FIG. 10B and similarly to the example shown in FIG. 10A, a first numerology 1010B may be used by a first group of WTRUs in a first part of a channel bandwidth and a second numerology 1030B may be used by a second group of WTRUs in a second part of the channel bandwidth. In an example, the first numerology 1010B may be used by URLLC WTRUs and the second numerology 1030B may be used by mMTC WTRUs. A common numerology 1020B may be used by an SSS 1050B and a PSS 1060B. In an example, the common numerology 1020B may be used across the channel bandwidth, and in time resources between time resources used for the first numerology 1010B and the second numerology 1030B. In an example, the common numerology 1020B may be the same numerology as one of the first numerology 1010B and the second numerology 1030B. In another example, the common numerology 1020B may be a third numerology and may be different from the first numerology 1010B and the second numerology 1030B. In an example, the common numerology 1020B may be a fixed numerology. Further, the common numerology 1020B may be independent of the first numerology 1010B and the second numerology 1030B.

For some scenarios, such as wide bandwidth scenarios, there may be multiple common numerology regions, for example, to carry one or more system signals. The common numerology may be used in a common numerology region. Examples of system signals include synchronization signals, broadcast signals, and the like. The location of the common numerology regions may be a function of the system bandwidth (for example, 200 megahertz (MHz), up to 1 gigahertz (GHz) or 2 GHZ) and/or the frequency band (for example, the 28 GHz band). In an example, the common numerology regions may be equally spaced throughout the system bandwidth. The spacing and/or the number of common numerology regions may be a function of the system bandwidth and/or the frequency band.

When a WTRU searches for a cell, the WTRU may search according to a frequency raster (for example, 200 kHz for LTE). The frequency raster may be a function of the frequency band. The location of the common numerology regions may be a function of the frequency raster.

Examples of WTRUs which may or may not use multiple numerologies include low cost IoT devices. If some WTRUs in the network cannot use multiple numerologies then the base station may transmit numerology specific synchronization signals, which are allocated in the time-frequency grid in a similar manner as the ones shown in FIGS. 10A and 10B. The specific location of those SSs may be signaled from higher layers, in a static or dynamic way, so that those WTRUs can know where to find the SSs.

In examples, uplink control channel mappings for mixed numerology systems may be used. Since the PUCCH resources may be mapped to the edges of the component carrier bandwidth, use of a mixed numerology may adversely impact PUCCH transmissions. The format of the PUCCH transmission, such as, for example, PUCCH Format 1 versus PUCCH Format 2, may be utilized to determine the degree of robustness imparted for the transmission.

For example, PUCCH Format 2 (used for channel state reports) may be transmitted closest to the edges of the uplink bandwidth, whereas PUCCH Format 1 (used for HARQ reporting and scheduling requests) may be mapped next. Since PUCCH Format 2 is mapped to resources closest to the band edges, these transmissions may have a greater susceptibility to interference from the adjacent numerology.

One way to improve PUCCH performance may be to utilize multiple antenna transmit diversity when the WTRU has multiple transmit antennas. In such a case, the WTRU may transmit the PUCCH using different frequency resources from the different antennas. The WTRU may therefore improve PUCCH performance, albeit at the cost of using an increased number of resources. The additional resources used need not be limited to the frequency domain only, as in this example, but may also be extended to include additional resources in the time domain as well.

Another example by which to achieve higher robustness may be to lower the coding rate of the control information transmitted in the partition-edge regions. In one example, control information may be spread over more subcarriers when transmitted on the band edges or partition edges. In another example, control information may be repeated when transmitted on the band edges or partition edges.

Another example may include transmitting the control information on resources that are not mapped to the band edges or partition edges. For example, if OFDM is used for the uplink transmission, a WTRU may transmit its control information within its resources that were allocated by a central controller. If the WTRU is not allocated any resources, the control information may be transmitted on a reserved set of resources. If a single carrier waveform, such as DFT-s-OFDM, is used for the uplink transmission, a set of resources away from the band edges may be reserved for control channel transmission. One example by which to indicate the set of resources allocated may include signaling the allocation to the WTRUs.

Figure 11:
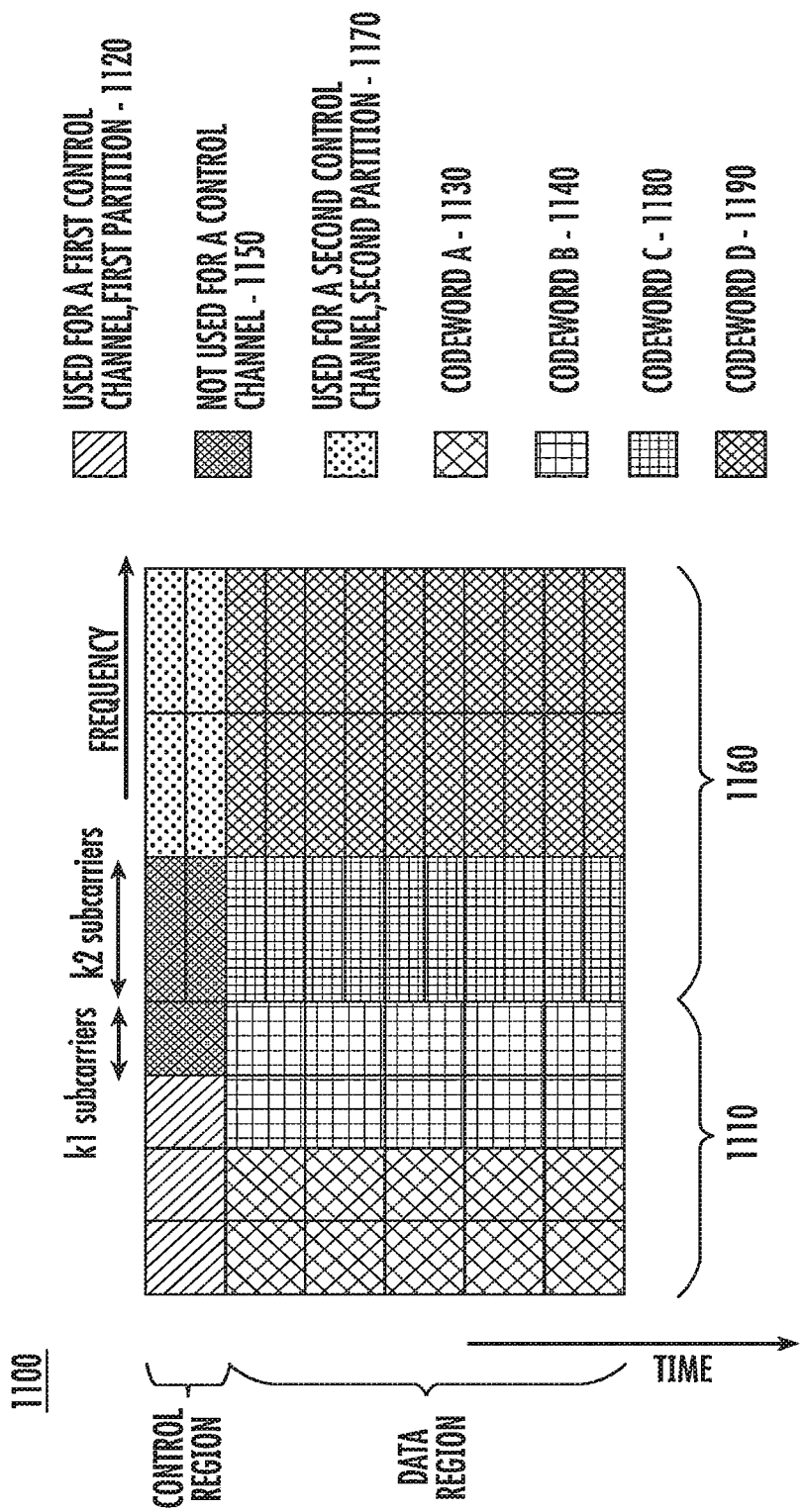
FIG. 11 is a diagram illustrating an example of control channel allocation.

FIG. 11 is a diagram illustrating an example of control channel allocation. In an example shown in diagram 1100, the number of subcarriers or number of groups of subcarriers that may be excluded from being used for control information transmission may be signaled. In examples, the size of a group of subcarriers may be pre-determined or defined.

As shown in FIG. 11, a first partition 1110 may be used for a first numerology and a second partition 1160 may be used for a second numerology. In a control region, resources 1120 in the first partition 1110 may be used for a first control channel and resources 1170 in the second partition 1160 may be used for a second control channel. Codeword A 1130 and Codeword B 1140 may be transmitted in the data region in the first partition 1110, and Codeword C 1180 and Codeword D 1190 may be transmitted in the data region in the second partition 1160. Resources 1150 may be not used for the control channel.

In an example, k1 subcarriers in the first partition 1110 and k2 subcarriers in the second partition 1160 may be excluded from being used for the control channel. In other words, k1 subcarriers and k2 subcarriers in resources 1150 may be excluded from being used for the control channel. One of ordinary skill in the art will appreciate that in this example, the partitions may not have edges next to other partitions on the left and right sides, respectively. Therefore, subcarriers in those sides may not need to be excluded from being used for the control channel. However, in general, subcarriers on both sides of the partition may be excluded.

The number of subcarriers k1 and k2 may be signaled by a central controller at the time partition set up or configured semi-statically. In an example, only k1, k2, or another value may be signaled or configured and the corresponding other values may be computed from the signaled value. For example, 180 MHz of spectrum may be excluded from control channel transmissions. The WTRU may compute that 180 MHz corresponds to 12 subcarriers in a partition with 15 KHz subcarrier spacing and 36 subcarriers in a partition with 5 kHz subcarrier spacing. The excluded subcarriers may be used for the transmission of user data or other less critical signals. For example, k1 subcarriers in resources 1120, k2 subcarriers in resources 1150 may be used for the transmission of user data or other less critical signals.

In examples, methods by which to mitigate uneven SINR distribution in the time domain across a sub-frame/TTI may be used. In some scenarios, the SINR may be distributed unevenly in the time domain across a sub-frame or a TTI. These scenarios may include, but may not be limited to, the operation in frequency selective channel when there are transitions from DTX (no transmission) to transmitting data, or when frequency hopping is used. In these cases, the first (or first few) symbols of the transmission after the discontinuity may be impacted by interference, and the SINR may be lower at the beginning of the sub-frame/TTI than for the rest of the sub-frame/TTI.

Figure 12:
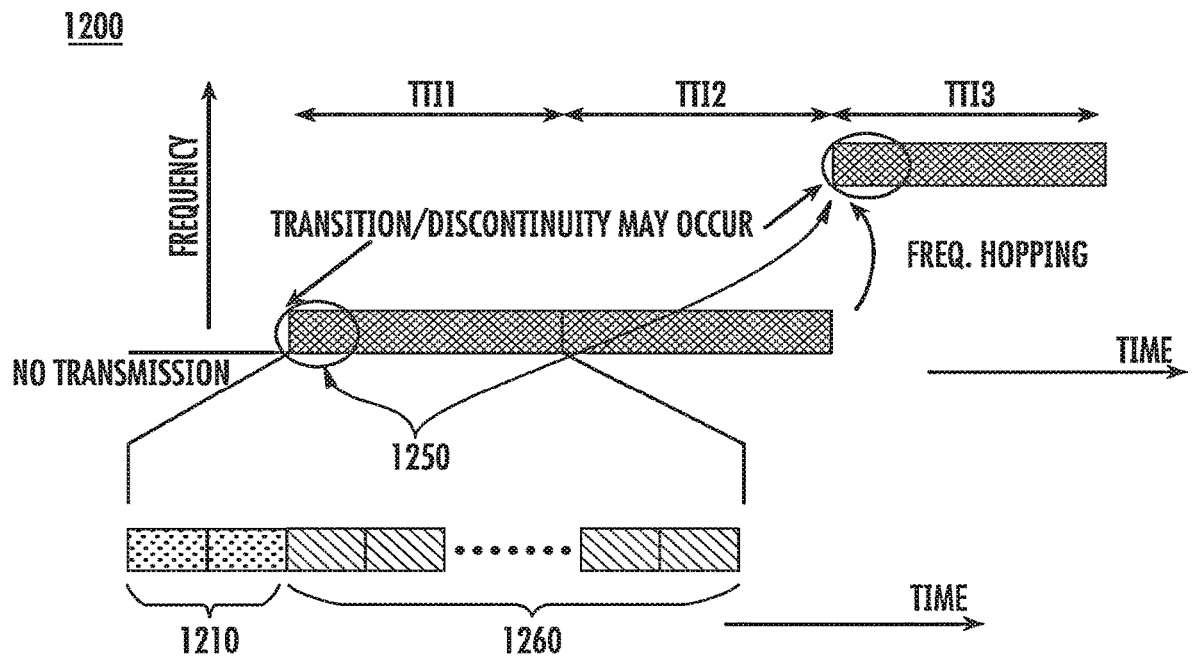
FIG. 12 is a diagram illustrating example methods for uneven time domain signal-to-interference-plus-noise ratio (SINR) distribution.

FIG. 12 is a diagram illustrating example methods for uneven time domain SINR distribution. In an example shown in diagram 1200, transitions and/or discontinuities in TTI1 and TTI3 may result in reduced SINR or SINR degradation in the areas 1250 at the beginning of the TTI/sub-frame. In an example, the first (or the first few) OFDM, DFT-s-OFDM, or unique word (UW)/zero tail (ZT) DFT-s-OFDM symbols 1210 of the sub-frame/TTI may be configured to use a lower modulation order. This may mitigate the SINR loss of the first OFDM symbols 1210. The rest of the OFDM/DFT-s-OFDM symbols 1260 of the sub-frame/TTI may be configured for a higher modulation order.

Figure 13:
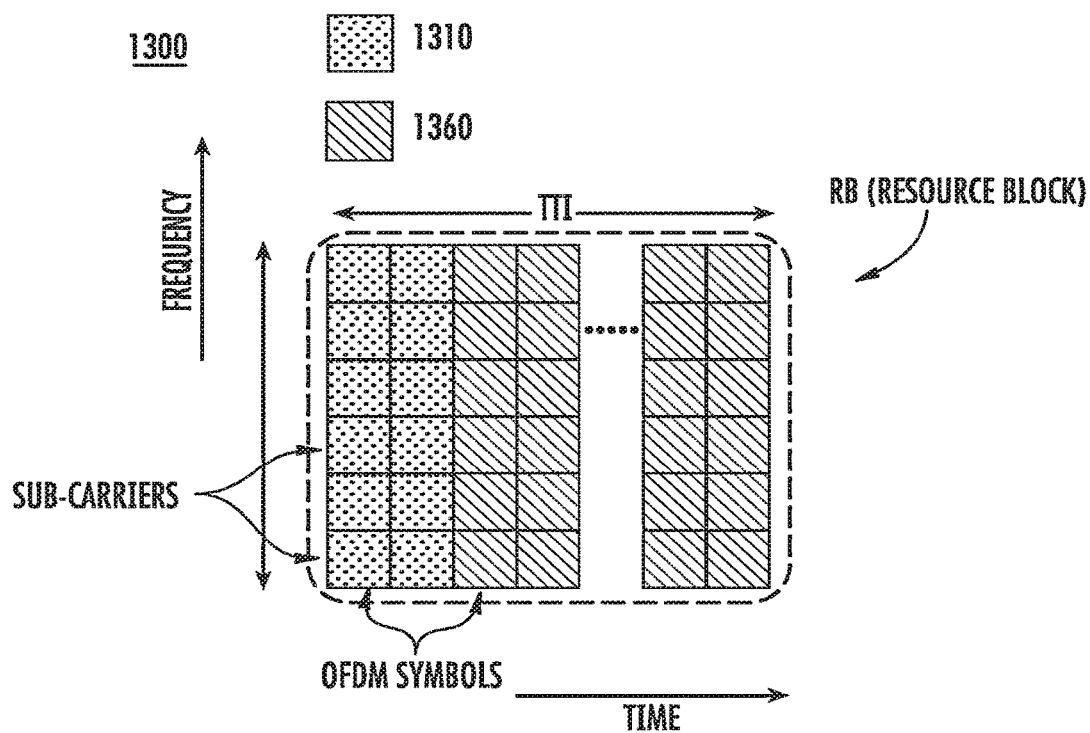
FIG. 13 is a diagram illustrating example methods for uneven time domain SINR distribution per resource block (RB)

FIG. 13 is a diagram illustrating example methods for uneven time domain SINR distribution per RB. In an example shown in diagram 1300, the first (one or a few) OFDM symbols 1310 of the sub-frame may use a low order modulation, such as Binary Phase Shift Keying (BPSK) or QPSK, while the remaining symbols 1360 may use 16-QAM, 64-QAM or higher. Examples are shown in FIG. 13 for one resource block (RB).

Figure 14:
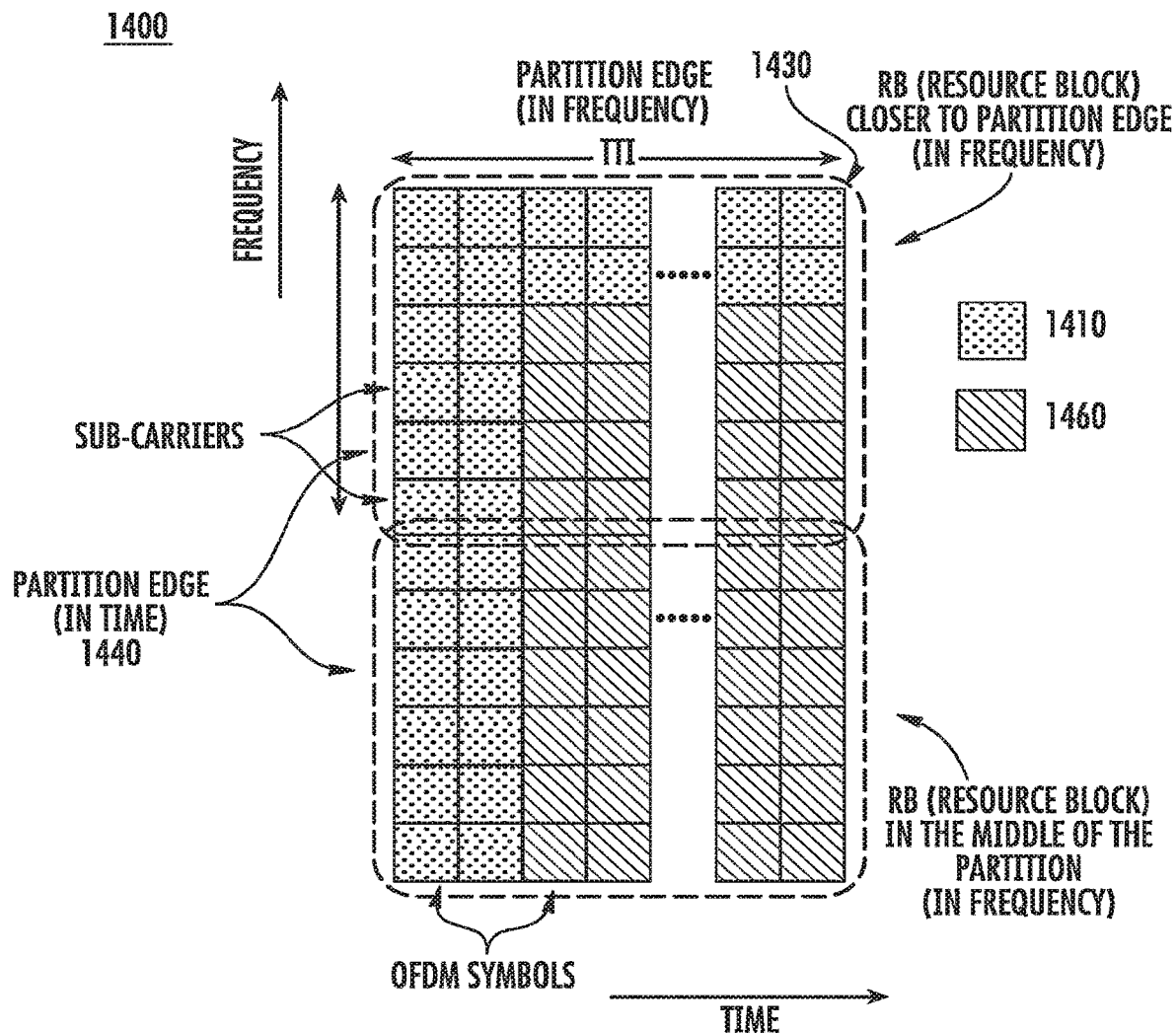
FIG. 14 is a diagram illustrating example methods for uneven time and frequency domain SINR distribution with a plurality of RBs.

FIG. 14 is a diagram illustrating example methods for uneven time and frequency domain SINR distribution with a plurality of RBs. In an example shown in diagram 1400, when an RB may be allocated closer to a partition edge, the REs 1410 in an RB that may be closer to the discontinuity of the partition edge, both in the time domain and in the frequency domain, may be allocated a lower modulation order. As shown in FIG. 14, a partition edge 1430 may be in the frequency domain and a partition edge 1440 may be in the time domain. In examples, the partition edge may be the band edge in the frequency domain. For example, partition edge 1430 may be a band edge. The remaining REs 1460 may be allocated a higher modulation order.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a wireless transmit/receive unit (WTRU), the method comprising:
receiving assignment information for receiving a first codeword using a first modulation and coding scheme (MCS) in a first set of resource blocks (RBs), and for receiving a second codeword using a second, different MCS in a second set of RBs, wherein the first set of RBs and the second set of RBs are in a first time interval in a first bandwidth part using a first subcarrier spacing; and
receiving, in one or more symbols of the first time interval in the first bandwidth part using the first subcarrier spacing, the first codeword using the first MCS in the first set of RBs and the second codeword using the second, different MCS in the second set of RBs, wherein at least a portion of the first codeword and at least a portion of the second codeword are received in at least a first symbol in the one or more symbols in the first time interval.

2. The method of claim 1, wherein the first MCS has a lower order modulation than the second MCS.

3. The method of claim 1, further comprising:
receiving a third codeword in a third set of RBs in a second time interval in a second bandwidth part using a second subcarrier spacing.

4. The method of claim 3, further comprising:
receiving a fourth codeword in a fourth set of RBs in the second time interval in the second bandwidth part using the second subcarrier spacing.

5. The method of claim 1, wherein the assignment information is received in downlink control information (DCI).

6. The method of claim 1, wherein the assignment information includes an overlap in the time domain of the first set of RBs and the second set of RBs.

7. The method of claim 1, wherein the first MCS has a modulation of Quadrature Phase Shift Keying (QPSK), 16-Quadrature Amplitude Modulation (QAM) or 64-QAM.

8. The method of claim 1, wherein the second MCS has a modulation of QPSK, 16-QAM or 64-QAM.

9. The method of claim 1, wherein at least a portion of the first codeword and at least a portion of the second codeword are received in a second symbol in the one or more symbols in the first time interval.

10. A wireless transmit/receive unit (WTRU) comprising:
a transceiver; and
a processor operatively coupled to the transceiver; wherein:
the transceiver and the processor are configured to receive assignment information for receiving a first codeword using a first modulation and coding scheme (MCS) in a first set of resource blocks (RBs), and for receiving a second codeword using a second, different MCS in a second set of RBs, wherein the first set of RBs and the second set of RBs are in a first time interval in a first bandwidth part using a first subcarrier spacing; and
the transceiver and the processor are configured to receive, in one or more symbols of the first time interval in the first bandwidth part using the first subcarrier spacing, the first codeword using the first MCS in the first set of RBs and the second codeword using the second, different MCS in the second set of RBs, wherein at least a portion of the first codeword and at least a portion of the second codeword are received in at least a first symbol in the one or more symbols in the first time interval.

11. The WTRU of claim 10, wherein the first MCS has a lower order modulation than the second MCS.

12. The WTRU of claim 10, further comprising:
receiving a third codeword in a third set of RBs in the second time interval in the second bandwidth part using the second subcarrier spacing.

13. The WTRU of claim 12, further comprising:
receiving a fourth codeword in a fourth set of RBs in the second time interval in the second bandwidth part using the second subcarrier spacing.

14. The WTRU of claim 10, wherein the assignment information is received in downlink control information (DCI).

15. The WTRU of claim 10, wherein the assignment information includes an overlap in time domain of the first set of RBs and the second set of RBs.

16. The WTRU of claim 10, wherein the first MCS has a modulation of Quadrature Phase Shift Keying (QPSK), 16-Quadrature Amplitude Modulation (QAM) or 64-QAM.

17. The WTRU of claim 10, wherein the second MCS has a modulation of QPSK, 16-QAM or 64-QAM.

18. The WTRU of claim 10, wherein at least a portion of the first codeword and at least a portion of the second codeword are received in a second symbol in the one or more symbols in the first time interval.

* * * * *